(12) United States Patent
Lee et al.

(10) Patent No.: US 11,650,745 B1
(45) Date of Patent: May 16, 2023

(54) INCREASED DATA PROCESSING PERFORMANCE OF A NON-VOLATILE MEMORY EXPRESS (NVME) BLOCK STORE

(71) Applicant: Oracle International Corporation, Redwood Shores, CA (US)

(72) Inventors: Kent Lee, Ladera Ranch, CA (US); Deepak Agarwal, Redmond, WA (US); Travis John Portz, Seattle, WA (US); Qiang Wang, Bellevue, WA (US); Haining Mo, Kenmore, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/515,357

(22) Filed: Oct. 29, 2021

(51) Int. Cl.
   *G06F 3/06* (2006.01)
(52) U.S. Cl.
   CPC ............ *G06F 3/0635* (2013.01); *G06F 3/067* (2013.01); *G06F 3/0613* (2013.01); *G06F 3/0653* (2013.01); *G06F 3/0659* (2013.01)
(58) Field of Classification Search
   CPC .... G06F 3/0635; G06F 3/0613; G06F 3/0653; G06F 3/0659; G06F 3/067
   See application file for complete search history.

(56) References Cited

U.S. PATENT DOCUMENTS

| | | | |
|---|---|---|---|
| 10,756,886 B2* | 8/2020 | Ganguli | G06F 3/0659 |
| 10,963,189 B1* | 3/2021 | Neelakantam | G06F 3/0616 |
| 2020/0174671 A1* | 6/2020 | Margaglia | G06F 3/065 |
| 2021/0279187 A1* | 9/2021 | Puder | G06F 13/1668 |
| 2022/0091754 A1* | 3/2022 | Raman | G06F 3/0613 |

OTHER PUBLICATIONS

Couvert, Patrice, and Datacenter Product Marketing. "High Speed I/O Processor for NVMe over Fabric." Flash Memory Summit (2016). (Year: 2016).*
Li, Huaicheng, et al. "Leapio: Efficient and portable virtual nvme storage on arm socs." Proceedings of the Twenty-Fifth International Conference on Architectural Support for Programming Languages and Operating Systems. 2020. (Year: 2020).*

* cited by examiner

*Primary Examiner* — Nicholas J Simonetti
(74) *Attorney, Agent, or Firm* — Kilpatrick Townsend Stockton LLP

(57) ABSTRACT

The present embodiments relate to throttling input/output (IO) processing tasks at a centralized node (e.g., a SmartNIC device) and implement multiple routing paths to prevent performance degradation in handling data patterns. For instance, the centralized node can implement a throttling system to assign portions of a number of input/output operations to be performed to a series of extent servers in a cloud infrastructure environment. The present embodiments also can implement multiple paths and/or multiple path groups to route the assigned portions of the I/O operations. For instance, the assigned portions of I/O operations can be routed to the extent servers via a first path of multiple paths. In the event of a failure of the first path, the assigned portions of I/O operations can be re-directed to a second path or another path in the path group.

20 Claims, 14 Drawing Sheets

INCREASED DATA PROCESSING PERFORMANCE OF A NON-VOLATILE MEMORY EXPRESS (NVME) BLOCK STORE

BACKGROUND

A computing network can include one or more servers configured to perform various processing tasks. For instance, the servers can execute various input/output (I/O) processing operations, such as performing querying of databases, processing data, storing data, etc. The I/O processing operations can be routed to one or more servers to execute the I/O processing operations.

However, in many instances, routing of the I/O processing operations to the servers may cause performance degradation in the servers. For example, if a first server is routed a large volume of I/O processing operations to be executed, the first server may be unable to perform the processes within a time duration, causing a delay in processing I/O processing operations or overheating of the first server.

SUMMARY

The present embodiments relate to throttling input/output (IO) processing tasks at a centralized node and providing multiple routing paths to prevent performance degradation in handling I/O processing operations. A first example embodiment provides a method for distributing input/output operations to be performed by a series of servers in a cloud infrastructure environment. The method can include receiving, at a computing instance in a cloud infrastructure environment, an instruction to perform a number of input/output operations from an application interacting with a client. The method can also include assigning portions of the number of input/output operations to be performed to a series of servers in the cloud infrastructure environment according to a data throttling system at the computing instance. The data throttling system can assign portions of the number of input/output operations to each of the series of servers based on a throttling value for the series of servers and one or more processing parameters for each of the series of servers.

The method can also include routing the assigned portions of the number of input/output operations to the series of servers. The method can also include receiving, from each of the series of servers, a processing output resulting from performance of the number of input/output operations. The method can also include forwarding the processing outputs resulting from performance of the number of input/output operations to the application.

A second example embodiment relates to a cloud infrastructure node. The cloud infrastructure node can include a processor and a non-transitory computer-readable medium. The non-transitory computer-readable medium can include instructions that, when executed by the processor, cause the processor to receive an instruction to perform a number of input/output operations from an application interacting with a client. The instructions can further cause the processor to assign portions of the number of input/output operations to be performed to a series of servers in an cloud infrastructure environment according to a data throttling system. The data throttling system can assign portions of the number of input/output operations to each of the series of servers based on a throttling value for the series of servers and one or more processing parameters for each of the series of servers.

The instructions can further cause the processor to select a first routing path of multiple routing paths to route the assigned portions of the number of input/output operations from the cloud infrastructure node to the series of servers. The instructions can further cause the processor to route the assigned portions of the number of input/output operations to the series of servers via the first routing path. The instructions can further cause the processor to receive, from each of the series of servers, a processing output resulting from performance of the number of input/output operations. The instructions can further cause the processor to forward the processing outputs resulting from performance of the number of input/output operations to the application.

A third example embodiment relates to a non-transitory computer-readable medium. The non-transitory computer-readable medium can include stored thereon a sequence of instructions which, when executed by a processor causes the processor to execute a process. The process can include receiving an instruction to perform a number of input/output operations from an application interacting with a client. The process can also include assigning portions of the number of input/output operations to be performed to a series of servers in a cloud infrastructure environment according to a data throttling system.

The process can also include selecting a first routing path of multiple routing paths to route the assigned portions of the number of input/output operations to the series of servers. The process can also include routing the assigned portions of the number of input/output operations to the series of servers via the first routing path. The process can also include receiving, from each of the series of servers, a processing output resulting from performance of the number of input/output operations. The process can also include forwarding the processing outputs resulting from performance of the number of input/output operations to an application capable of being interacted with by a client.

DETAILED DESCRIPTION

Figure 1:
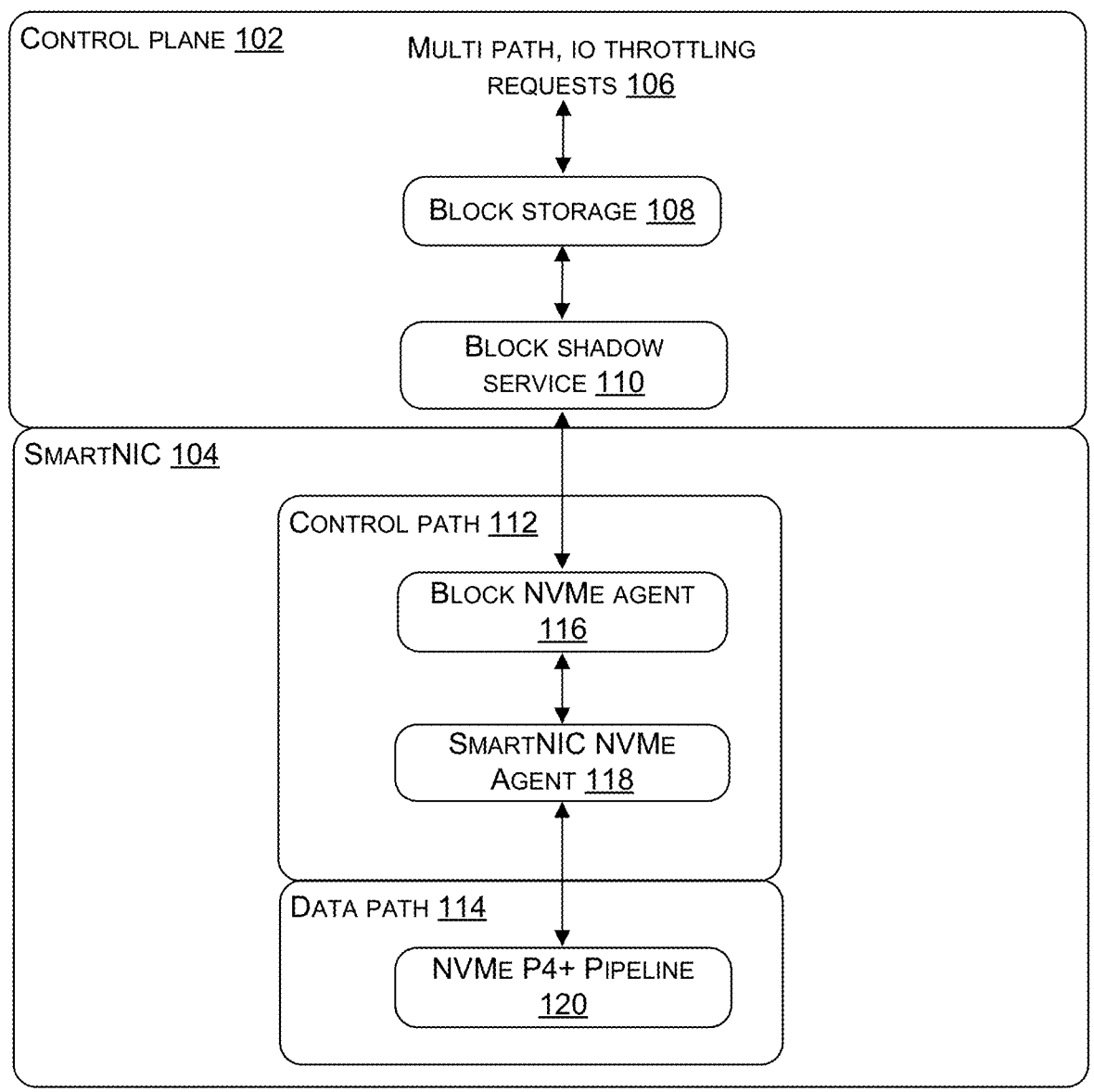
FIG. 1 is a block diagram illustrating an example Smart-NIC device, according to at least one embodiment.

The present embodiments relate to throttling input/output (IO) processing tasks at a centralized node (e.g., a SmartNIC device) to prevent performance degradation in handling data patterns. For instance, the centralized node can implement a throttling system to assign portions of a number of input/output operations to be performed to a series of extent servers in a cloud infrastructure environment. The throttling system can assign I/O operations to various servers based on previous processing operations assigned to each of the extent servers or the data pattern associated with the instructions to perform the I/O operations. The throttling system performed at the centralized node as described herein can assign I/O operations to servers for execution of the I/O operations with an increased performance and mitigated performance degradation due to specific data patterns in the instructions to perform the I/O operations.

As an illustrative example, a system can include ten extent servers configured to process I/O operations for a specific client with a volume of 100 k I/O operations. In some cases, each extent server can include a local throttling value of 10 k I/O operations, or a 10% maximum processing performance percentage. In the event that 100 k I/O operations are evenly distributed across each extent server (e.g., 10 k I/O operations to each extent server), each extent server can process the respective I/O operations. However, when instructions to perform I/O operations are not equally distributed across all extent servers, a subset of the extent servers can be provided I/O operations exceeding the local throttling value. For example, five of the ten extent servers can be routed 20 k I/O operations, greater than the local throttling value of 10 k I/O operations. In this event, the subset of the extent servers may hold back commands to process I/O operations over the local throttling value (e.g., 10 k I/O operations). Such prevention of processing I/O operations over a local throttling value can degrade performance of the extent servers in processing the I/O operations.

As described herein, the present embodiments can centralize distribution of throttling I/O operations to extent servers. Particularly, a throttling mechanism can be incorporated in a P4 pipeline executing within a SmartNIC with NVMe as described below. For example, the throttling mechanism can include a throttling value of 100 k I/O operations for all extent servers. Further, in the example illustrated above, when five of the ten extent servers are routed 20 k I/O operations, a throttling value for each extent server can be temporarily increased by the throttling mechanism to 20 k I/O operations. This can allow for each extent server to perform the 20 k I/O operations, dynamically increasing the performance of the extent servers in processing the I/O operations.

The present embodiments also can implement multiple paths and/or multiple path groups to route the assigned portions of the I/O operations. For instance, the assigned portions of I/O operations can be routed to the extent servers via a first path of multiple paths. In the event of a failure of the first path, the assigned portions of I/O operations can be re-directed to a second path. As another example, the assigned portions of I/O operations can be routed to the extent servers via a first path included in a first path group of multiple path group. The first path group can include the first path comprising an active path and multiple inactive paths. In the event of a failure of the first path in the first path group, the assigned portions of I/O operations can be re-directed to a second path (e.g., an inactive path) in the first path group. Utilizing multi-pathing can increase performance in routing the assigned portions of I/O resources while being able to re-direct the assigned portions of I/O resources in the event of a failure or low performance of a first path.

The present embodiments can mitigate performance degradation and maintain performance in assigning portions of I/O resources to extent servers for execution of the I/O processes. For instance, rather than having each extent server individually having an assigned static throttling value, a centralized node (e.g., a SmartNIC) can include a throttling system to dynamically assign I/O processing operations to the series of extent servers to increase efficiency and performance in execution of the I/O processing operations by the series of extent servers. As an example, if a first extent server has previously been assigned I/O processing operations of 100 k input/output processes per second (IOPS), the throttling system at the centralized node can route subsequent I/O processing operations from the first extent server to prevent performance issues (e.g., delays in processing, overheating) in the first server. Implementing a throttling system at a centralized node can dynamically assign I/O processing operations to increase performance in executing the I/O processing operations by the series of extent servers.

The present embodiments can implement non-volatile memory express (NVMe) components to perform I/O operations throttling and multi-path routing of I/O operations as described herein. The NVMe components can include an interface architecture for accessing a non-volatile storage medium via a bus (e.g., a peripheral component interconnect express (PCIe) bus). The NVMe components can direct a command to perform I/O operations from a client device to a NVMe storage module (e.g., a NVMe (PCI) controller). For example, a command to perform I/O operations can be passed from a client device to a host server. The command can be routed from a NVMe driver at the host server to a PCIe port and directed to the NVMe controller within a SmartNIC.

The SmartNIC can include a programmable network interface controller executing on a device within the host server. The SmartNIC can implement a data pipeline (e.g., P4 pipline) configured to route I/O operations to a series of extent servers via a NVMe/TCP target server. For example, the NVMe controller within a P4 pipeline can be used to forward I/O operations from the P4 pipeline to a NVMe/TCP target server. The NVMe/TCP target server, in turn, can route the I/O operations to the series of extent servers as specified by the NVMe controller.

The series of extent servers can include computing instances capable of processing I/O operations as described herein. For example, extent(s) on four extent servers can be assigned to a specific client and can perform I/O operations as specified by a client. There can include one or more extents on an extent server. The extents on different extent servers can be grouped and assigned to a specific client for I/O operations. Example I/O operations can include processing input data to derive corresponding output data, retrieving specified data from a series of databases, or updating the series of databases, for example.

Each of the series of extent servers can be throttled using a throttling value. For example, a throttling mechanism at the SmartNIC can comprise a throttling value of 100 k I/O operations for the series of extent servers. In response to obtaining a request to perform 20 k I/O operations from a client device, the throttling mechanism can specify an extent server to perform the I/O operations. Further, the throttling mechanism can increase a throttling value for the specified extent server to 20 k I/O operations. The I/O operations can be forwarded from the P4 pipeline to the specified extent server via the target server.

A. System Overview

As described herein, the I/O operations can be throttled by a centralized nodes in a cloud infrastructure service. The centralized node(s) can include a host server comprising one or more computing instances for implementing the dynamic throttling of I/O operations to the extent servers or implement multi-pathing as described herein.

FIG. 1 is a block diagram illustrating an example SmartNIC device 100. The SmartNIC device 100 can include a control plane 102 and a SmartNIC 104. The control plane 102 can be used to program the SmartNIC 104. Further, the control plane 102 can obtain instructions to perform I/O processing operations (e.g., multi-path, I/O throttling requests 106) from a client device or application associated with a client.

Responsive to receipt of instructions to perform I/O processing operations, data relating to the received instructions can be stored in block storage control plane 108 and directed to the SmartNIC 104 via a block shadow service 110. The block shadow service 110 can include a representational state transfer (REST) service in the block storage control plane 108 that can receive internal operation APIs (e.g., a NVMe attachment API call) and send the data to the SmartNIC 104 for populating metadata for a corresponding attachment.

The SmartNIC 104 can include a programmable network interface controller (NIC) that comprises a control path 112 and data path 114. The control path 112 can include a block non-volatile memory express (NVMe) agent 116 and a SmartNIC NVMe agent 118 configured to direct the instructions to perform I/O processing operations to a series of servers via the data path 114. The block NVME agent 116 can act as a communication link between block shadow service 110 and the SmartNIC NVMe agent 118. The block NVME agent 116 can make remote procedure (e.g., gRPC) calls to the SmartNIC NVMe agent 118 to configure NVMe virtualization objects. The SmartNIC NVMe agent 118 can include a gRPC service used to configured the NVMe virtualization objects (e.g., namespaces, path groups, target subsystems).

The data path 114 can comprise a NVMe P4+ pipeline to route the I/O processing operations to the series of servers. The NVMe P4+ pipeline can include a data path to route I/O operations to the series of extent servers via a target server. For instance, the NVMe P4+ pipeline can include a NVMe controller and an NVMe initiator to route I/O operations to the target server via a port. Further, the NVMe P4+ pipeline can implement a throttling mechanism dynamically modifying a throttling value for the series of extent servers as described herein.

Figure 2:
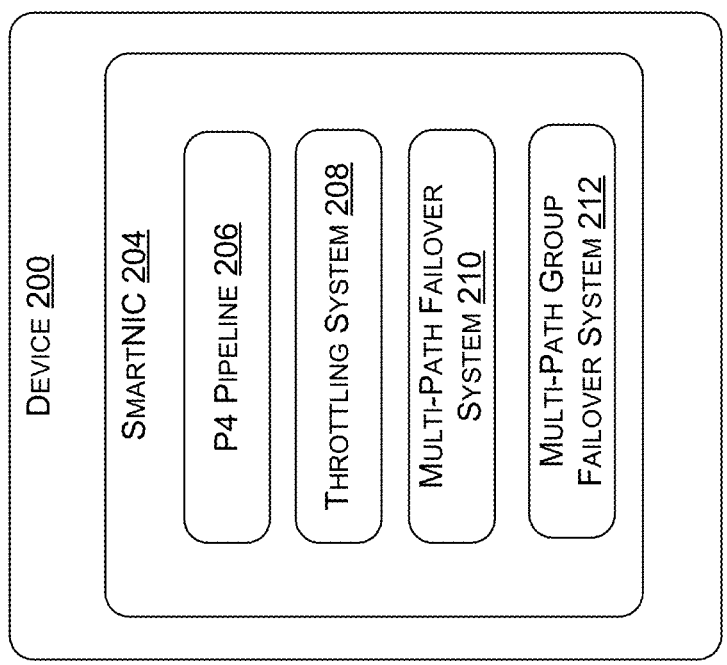
FIG. 2 is a block diagram of an example device, according to at least one embodiment.

As described herein, the cloud infrastructure service can implement a device. The device can comprise a computing instance capable of implementing a SmartNIC with NVMe. FIG. 2 is a block diagram of an example device 200. The device 200 can include a computing instance executable by the control plane server (e.g., 102). The device 200 can implement a SmartNIC 204 that can facilitate NVMe data routing as described herein. The device 200 can also include a P4 pipeline 206 that routes I/O processing operations to a series of extent servers for execution of the operations by the servers.

The device 200 can also include a throttling system 208. The throttling system 208 can include a centralized throttle to distribute/assign I/O processing operations to be executed by each of a series of extent servers. The throttling system 208 can monitor the extent servers and dynamically assign I/O processing operations to extent servers based on a variety of parameters, such as a volume of I/O processing operations (e.g., IOPS), previous I/O processing operations assigned to each server, a delay in executing operations at each server, performance metrics associated with each server, etc. The throttling system 208 can have a maximum throttling value for the extent servers and can be used in assigning I/O processing operations to the extent servers. The throttling system is described in greater detail with respect to FIG. 4.

The device 200 can include a multi-path failover system 210. The multi-path failover system 210 can maintain and monitor a series of paths capable of routing I/O processing resources to the series of extent servers. In the event of a first path being unavailable or failing, the I/O processing resources can be redirected to the series of extent servers via a second path. Implementing multiple paths in routing I/O processing resources to the series of extent servers is discussed in greater detail with respect to FIG. 6.

The device 200 can also include a multi-path group failover system 212. The multi-path group failover system 212 can maintain and monitor a series of path groups capable of routing I/O processing resources to the series of extent servers. Each path group can include an active path and one or more inactive paths. In the event of an active group in a first path group being unavailable or failing, the I/O processing resources can be redirected to the series of extent servers via an inactive path in the path group. Any of the throttling system 208, the multi-path failover system 210, and/or the multi-path group failover system 212 can reside in a scheduler of a direct memory access node. Implementing multiple path groups in routing I/O processing resources to the series of extent servers is discussed in greater detail with respect to FIG. 7.

B. I/O Processing Operations Throttling

A series of servers in a cloud infrastructure environment can be configured to execute a series of I/O processing tasks. However, a volume of data for each server can be throttled to mitigate delays and performance issues (e.g., overheating) by each server. Accordingly, rather than assigning all I/O processing operations to a single server, portions of the I/O processing operations can be assigned to multiple extent servers.

Figure 3:
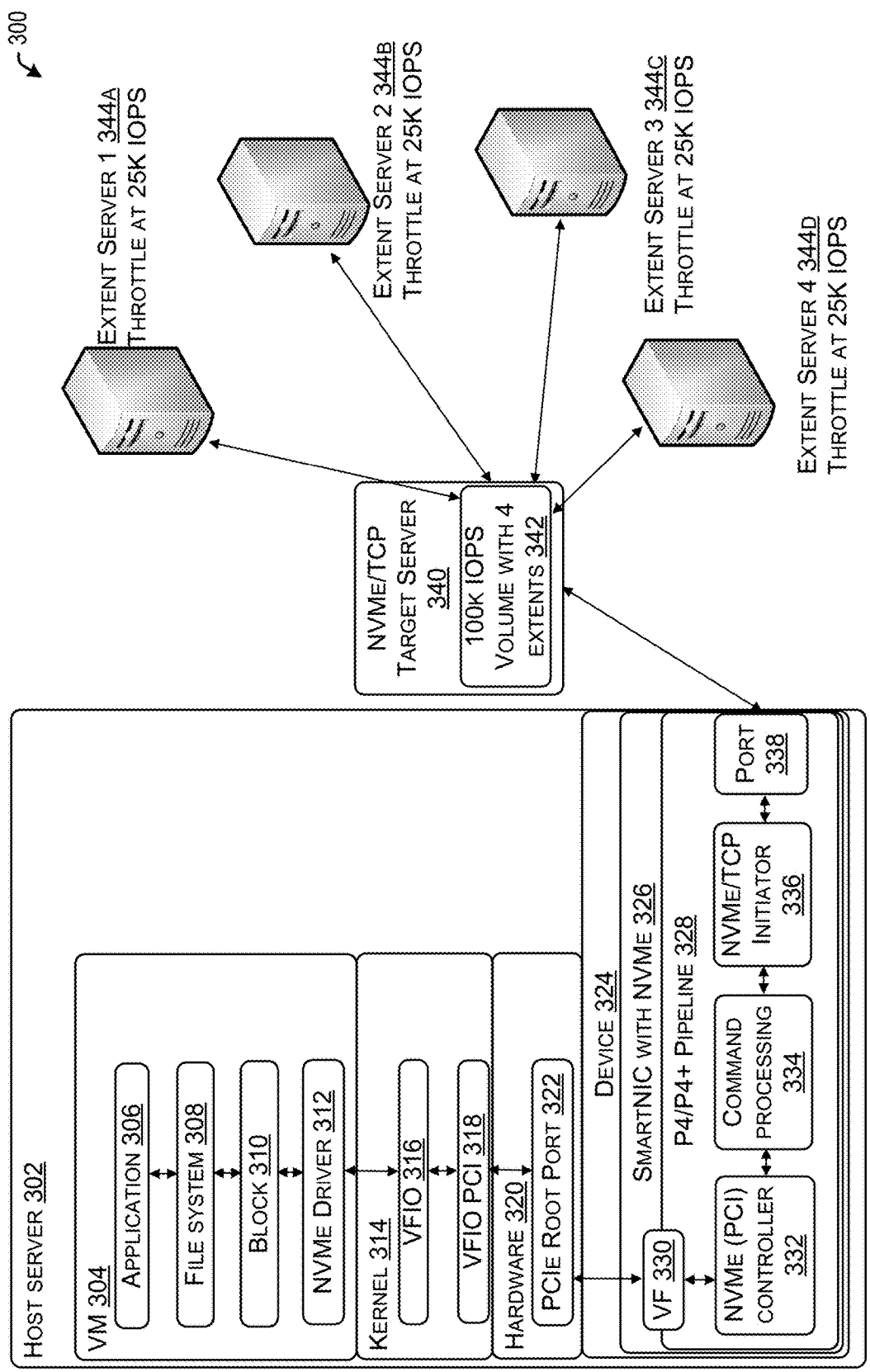
FIG. 3 is a block diagram for distributing I/O processing operations to extent servers that each comprise a throttling value, according to at least one embodiment.

FIG. 3 is a block diagram 300 for distributing I/O processing operations to extent servers that each comprise a throttling value. In many cases, each extent server 344a-d can include a throttling value. For instance, each extent server 344a-d can include a throttling value of 25 k IOPS (e.g., a 25% performance of a total 100 k IOPS). As described in greater detail below, maintaining throttling values at each extent server 344a-d can cause performance degradation in executing I/O processing operations.

As shown in FIG. 3, the host server 302 can cause direction of I/O processing operations to the series of extent servers 344a-d via a NVMe/TCP target server 340. For example, the NVMe initiator 336 can direct I/O operations to NVMe/TCP target server 340 via port 338. In turn, the NVMe/TCP target server 340 can route the I/O operations to the extent servers 344a-d based on a data placement module included in the NVMe/TCP target server 340.

The host server 302 can include features similar to host server 100 as described in FIG. 1. The host server 100 can include a virtual machine (VM) 304, kernel 314, hardware 320, and a device 324. The VM 304 can include an application 306, file system 308, block 310, and NVMe driver 312. The VM 304 can receive instructions to perform I/O processing operations (e.g., via a client device connected to application 306) and can route the instructions to the kernel 314 via NVMe driver 312.

The kernel 314 can include virtual function I/O (VFIO) 316 and a VFIO Peripheral Component Interconnect (PCI) 318. The VFIO 316 can include an input-Output Memory Management Unit (IOMMU)/device agnostic framework for exposing direct device access to a user space. The VFIO PCI 318 can provide a connection from the VFIO 316 to the PCI express (PCIe) root port 322 in the hardware 320 of the host server 302. The VFIO framework can be used for exposing direct device access to the userspace. Without the VFIO framework, since the VM 304 is in a userspace, the guest kernel driver (e.g., NVMe driver 312) may not be able to access the VF 330 directly. In other words, the VFIO framework may allow NVMe driver 312 access to VF 330, bypassing the host server's storage kernel stacks.

The PCI Express Root Port 322 can include a port on the root complex (e.g., the portion of the motherboard that contains the host bridge). The host bridge can allow the PCI ports to talk to the rest of the computer, allowing components plugged into the PCI Express ports to work with the computer. The host server can use the root port to send Transaction Layer Packet (TLP) to the SmartNIC's port. The NVMe commands can be transferred via TLPs to the SmartNIC.

The device 324 can include a computing instance executing in the host server 302 and can comprise a SmartNIC with NVME 326 and a P4/P4+ pipeline 328. As noted above, the pipeline 328 can route I/O operations from the SmartNIC with NVME 326 to the target server 340. The PCIe root port 322 can connect to the pipeline 328 via a virtual function (VF) 330. The pipeline 328 can route I/O processing instructions to the target server 340 for performance by the extent servers 344a-d. The pipeline 328 can include a NVMe PCI controller 332, a command processing system 334, an NVMe/TCP initiator 336, and a port 338 to route instructions to the target server.

The I/O processing resources can be routed from the pipeline 328 to the extent servers 344a-d via the target server 340. As an example, the target server 340 can include a 100 k IOPS volume and can be connected to four extent servers 344a-d. Each extent server 344a-d can include a 25 k throttling value. In these cases, the extent servers 344a-d can perform the I/O processing operations according to the throttling values.

However, data patterns in receiving the instructions to perform the I/O processing operations can cause performance degradation in processing the instructions. For instance, a series of instructions to perform the I/O processing operations can cause executing of operations by a portion of the extent servers (e.g., where only server 1 344a and server3 344c executes a series of operations). Due to the extent servers 344a-d each having throttle values and being unaware of the processing loads of other servers 344a-d, the servers 344a-d may individually process a portion of the I/O processing instructions according to the throttle value. Accordingly, without a centralized node monitoring the status of the servers and being capable of dynamically assigning portions of the I/O processing operations to the extent servers 344a-d.

Figure 4:
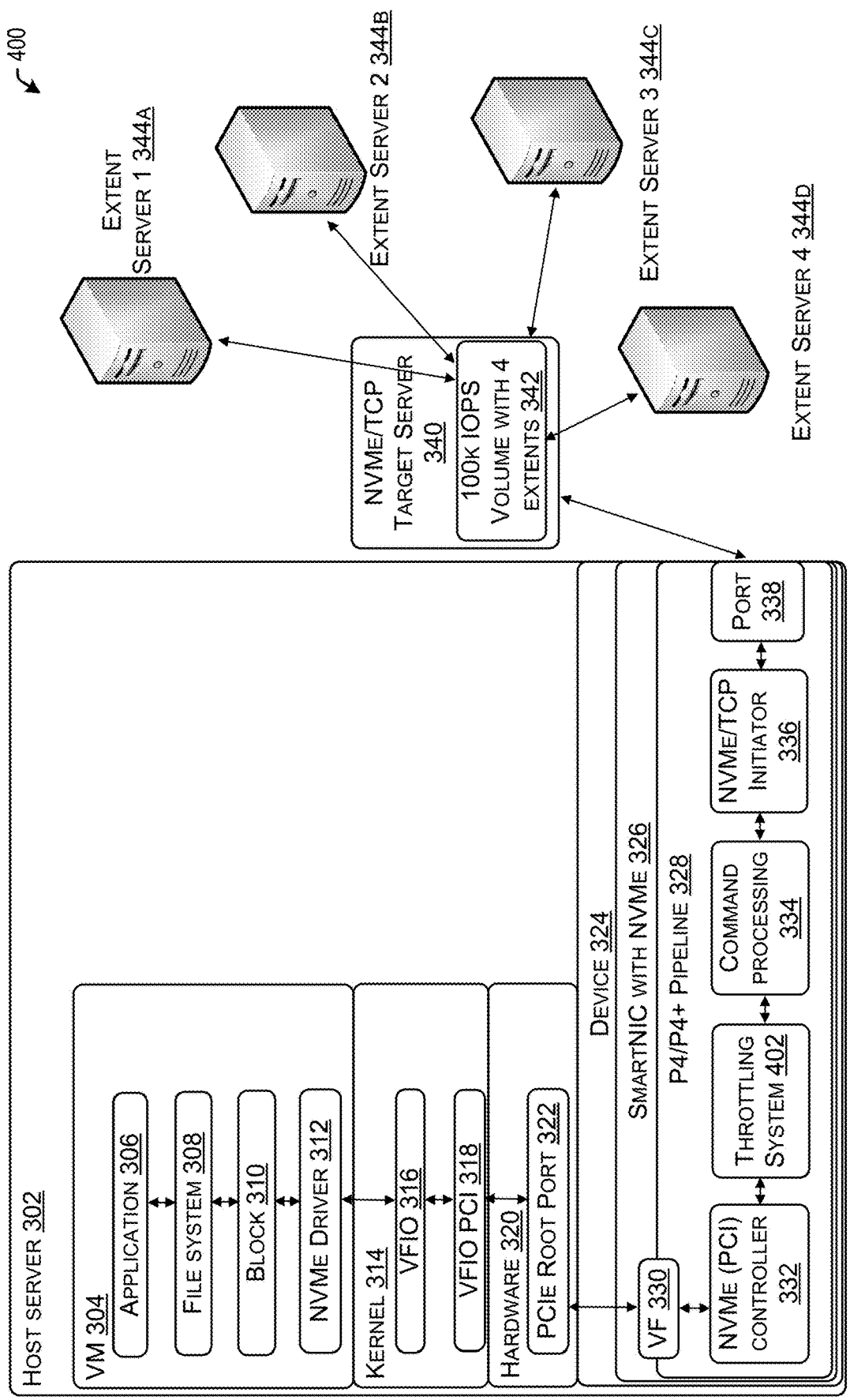
FIG. 4 is a block diagram for distributing I/O processing operations to extent servers using a throttling system at a centralized node, according to at least one embodiment.

FIG. 4 is a block diagram 400 for distributing I/O processing operations to extent servers using a throttling system 402 at a centralized node (e.g., device 324), as described above. The embodiment as shown in FIG. 4 provides a computing instance (e.g., device 324) implementing a throttling system 402. The throttling system 402 can include a throttling value (e.g., 100 k IOPS) for the extent servers 344a-d and can dynamically assign portions of the I/O processing operations to the series of extent servers 344a-d.

The throttling system 402 included in the device 324 can eliminate or reduce the performance drop caused by uneven I/O distribution to fewer extent servers. For example, the throttling system 402 can process commands to perform I/O operations and determine whether to modify a throttling value for specific extent servers 344a-d to increase performance of processing the I/O operations. Further, the throttling system 402 can free resources held up along the pipeline due to throttling values at each extent server. For instance, the throttling system 402 can allow for other namespaces to use SmartNIC resources or different volume attachments to use storage performance development kit (SPDK) target resources. In some cases, more I/O can be routed to extent servers 344a-d due to the servers being less likely to wait for resources to be freed.

Additionally, the throttling system 402 may be able to eliminate or reduce the extent server throttling for non-shareable volume attachments, which can be the default for volume attachments. For example, each extent server can include one or more virtual machines performing various services across the series of extent servers. The throttling values can be based on each extent server and can aggregate I/O operations performed by volume attachments on each extent server. I/O throttling may still be performed at the extent servers 344a-d for shareable volume attachments, so the combined I/O and bandwidth of all instances do not exceed the volume limit. In some instances, there still can be a limit to ensure that the extent servers 344a-d are not excessively stressed. However, the limit can be higher than 1/X, where X is the number of extent servers for the volume. For example, extent server can throttle at more than 33 percent of the volume limit for a volume that has three Extent Servers.

C. Multiple Pathing of I/O Processing Operations

As described above, I/O processing operations can be routed from a host server to the extent servers via a pipeline. However, for any of a variety of reasons, data communication between the host server and the extent servers can fail, resulting in lost computing resources and/or delay in processing I/O processing operations.

The use of a multi-path group can be used to ensure performance of a namespace. For example, if a namespace has an IOPS rate of 1 million IOPS, a single target server may be unable to handle the processing of the IOPS. Accordingly, multiple paths can be used to support the IOPS processing resources. The I/O operations can be distributed across the paths.

Figure 5:
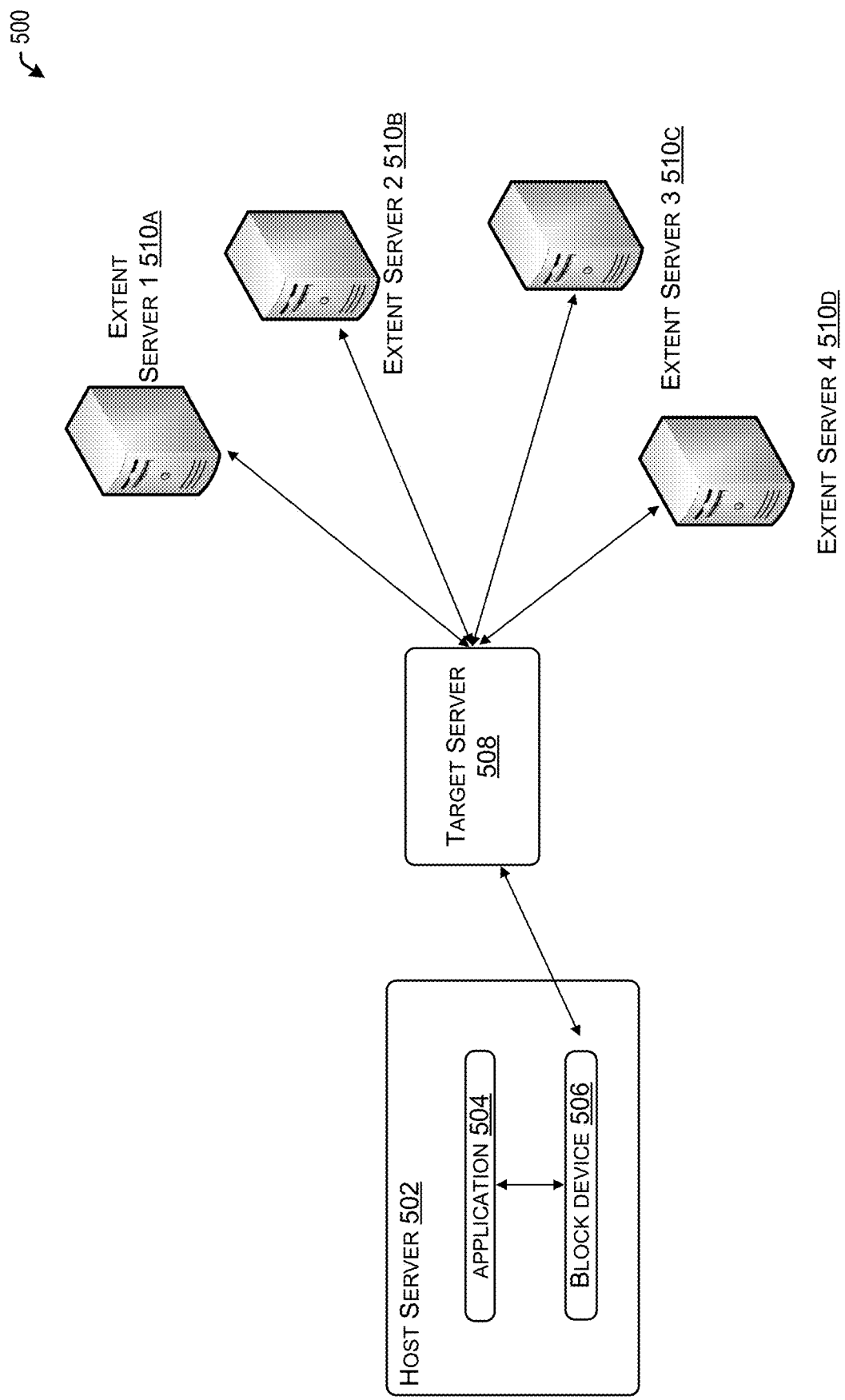
FIG. 5 is a block diagram of a system for processing I/O processing operations across a single path, according to at least one embodiment.

FIG. 5 is a block diagram 500 of a system for processing I/O processing operations across a single path. As shown in FIG. 5, the host server 502 can include an application 504 and a block device 506. The block device 506 can direct I/O processing operations from the application 504 to the target server 508. The block device 506 can include a storage module, such as a local hard disk or a remote storage module. The block device 506 can connect to a target via any of a variety of network protocol(s). The target server 508 can distribute assigned I/O processing operations to extent servers 510*a*-*d* over the single path.

However, for any of a variety of reasons, the path from block device 506 to target server 508 can become unavailable. For example, data connection between the block device 506 and target server 508 may fail, causing a delay in providing I/O operations to the target server 508. In such instances, the I/O processing operations may not reach (or be delayed to) the extent servers 510*a*-*d*. Such delays can result in delayed or failures in processing the I/O processing operations. Therefore, multiple routing paths can be implemented to allow for failover from a first routing path to another routing path in the event of failure of the first routing path.

Figure 6:
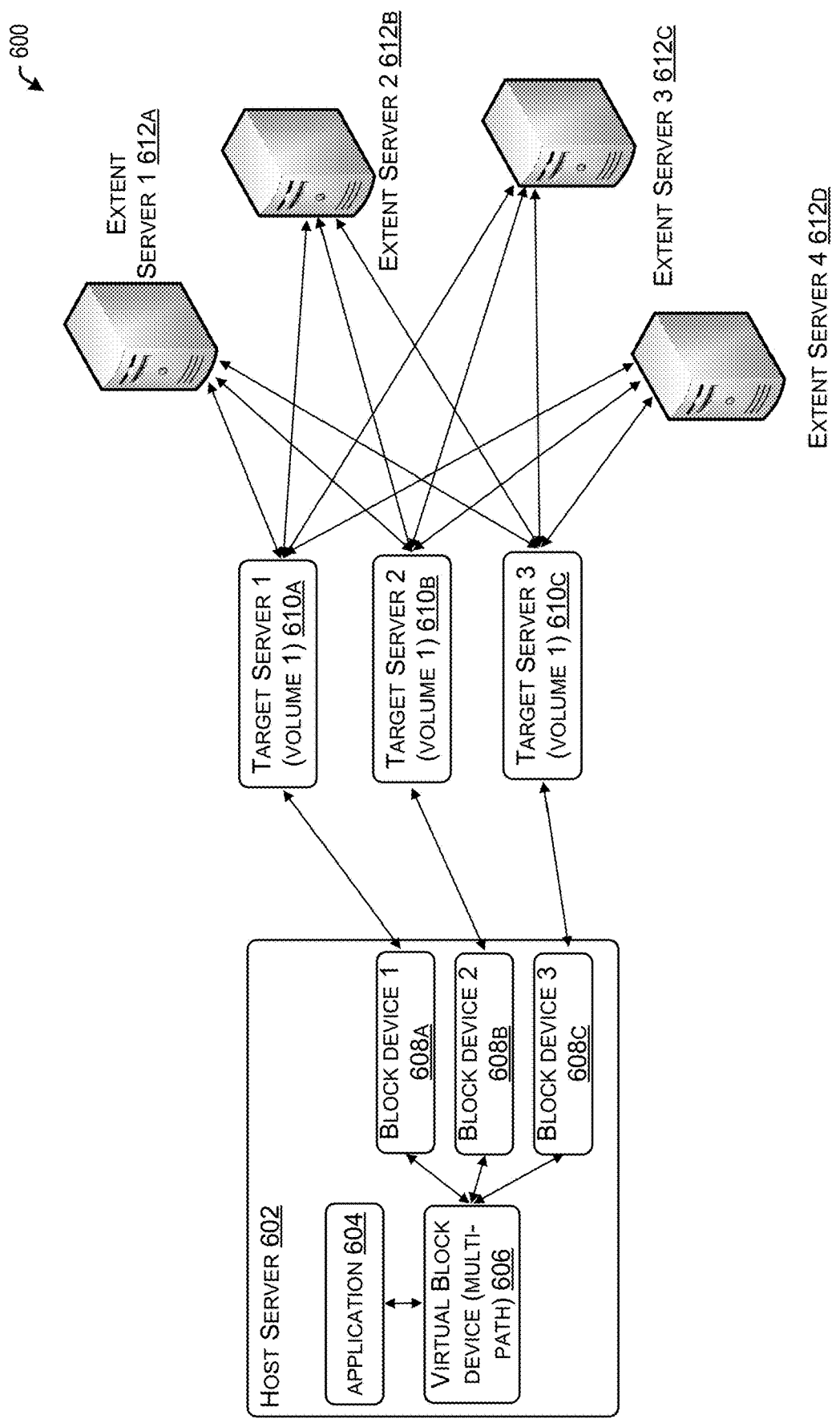
FIG. 6 is a block diagram of a system including multiple paths for processing I/O processing operations, according to at least one embodiment.

FIG. 6 is a block diagram 600 of a system including multiple paths for processing I/O processing operations. As shown in FIG. 6, the multiple paths can be available to route I/O processing operations to the extent servers 612*a*-*d*. For instance, the host server 602 can include a virtual block device 606 that implements multiple block devices (e.g., block devices 608*a*-*c*). Each block device 608*a*-*c* can implement a route and can connect to a corresponding target server 610*a*-*c*. For instance, a first route can include block device 1 608*a* connecting to target server 1 610*a* via an internet small computer systems interface (iSCSI)/NVMe-over fabrics (of) connection. Each target server 610*a*-*c* can route I/O processing operations to the extent servers 612*a*-*d*. The multi-path architecture can protect data access when a path fails.

In the embodiment as shown in FIG. 6, if a first path fails, the I/O processing operations can be re-directed to the extent servers 612*a*-*d* via a second path. For example, responsive to target server 1 610*a* becoming unavailable to the block device 608*a*, the virtual block device 606 can migrate I/O processing operations to a second block device 608*b* and a second target server 610*b* to route to the extent servers 612*a*-*d*.

In addition to having multiple paths, the present embodiments can provide multiple path groups. Each path group can provide redundancy per path and can stabilize performance of the system. Each path group can include one active path and multiple passive paths to allow active-passive failover and protect against performance degradation caused by path failures.

Figure 7:
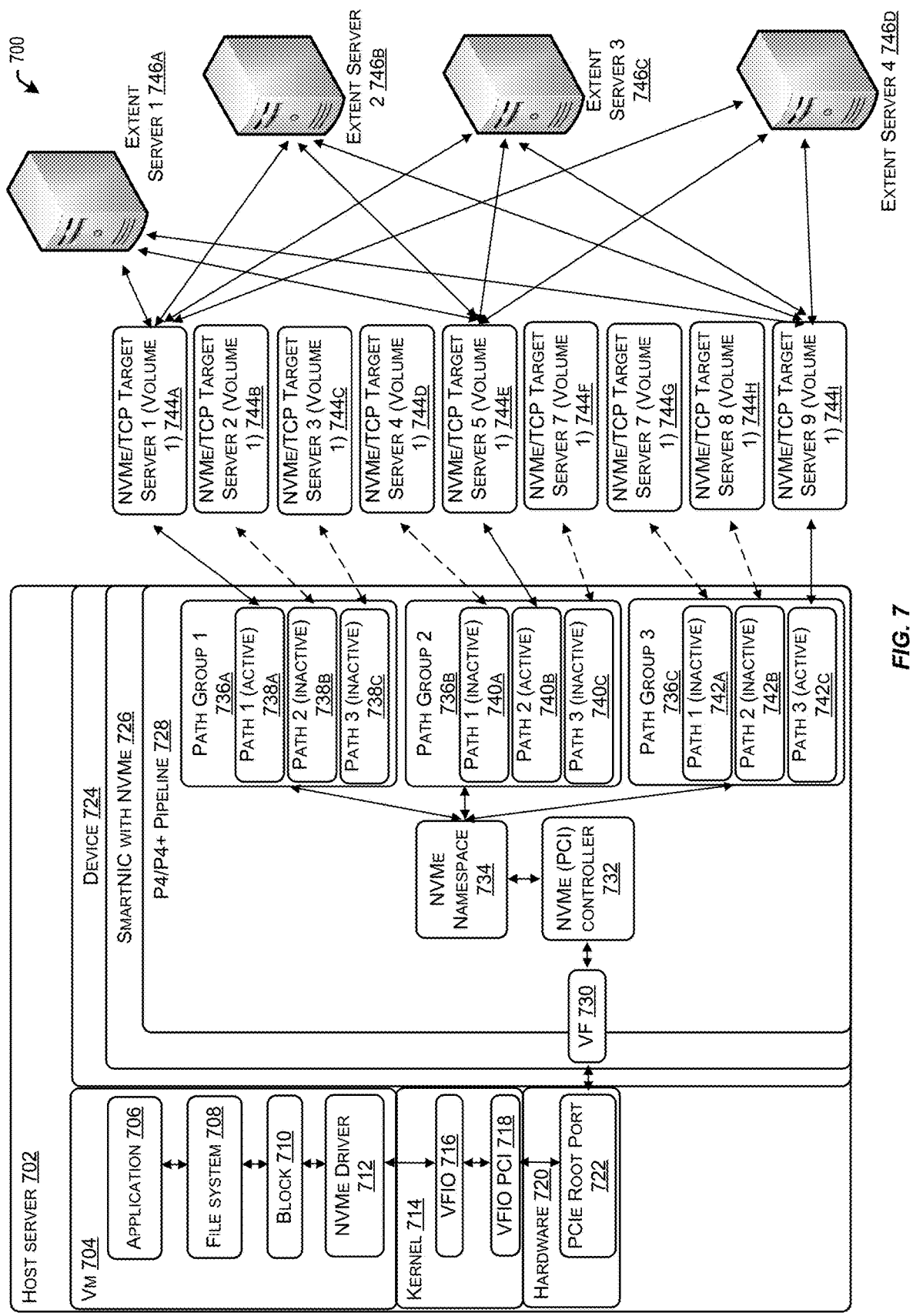
FIG. 7 is a block diagram illustrating a system including multiple path groups for processing I/O processing operations, according to at least one embodiment.

FIG. 7 is a block diagram 700 illustrating a system including multiple path groups for processing I/O processing operations. As shown in FIG. 7, the device 724 can include multiple path groups 736*a*-*c*. Each path group can include an active path (e.g., 738*a*) and multiple inactive paths (e.g., 738*b*-*c*). The active path (e.g., 738*a*) can comprise a primary route of I/O processing operations to the extent servers 746*a*-*d*.

In the event of the active path being unavailable, an inactive path in the path group (e.g., 738*b*) can be identified as the active path. The new path (e.g., 738*b*) can connect to the target server 744*b* and connect to the extent servers 746*a*-*d*. In the event of all paths in a path group (e.g., 736*a*) being unavailable, a new path group (e.g., 736*b*) can be identified as a new path (e.g., via path 740*b*).

Migration of I/O processing operations to another path or path group can allow for continuation of data communication to the target server in the event of failure of a first path or path group. Accordingly, rather than delaying transmission of the I/O processing operations over a first path or first path group in the event of a data processing failure over the first path/first path group, the transmission of the I/O processing operations can be migrated to another routing path or path group to ensure transmission of the I/O processing operations to the target server.

D. Multiple Pathing and I/O Throttling in I/O Processing Operations

Figure 8:
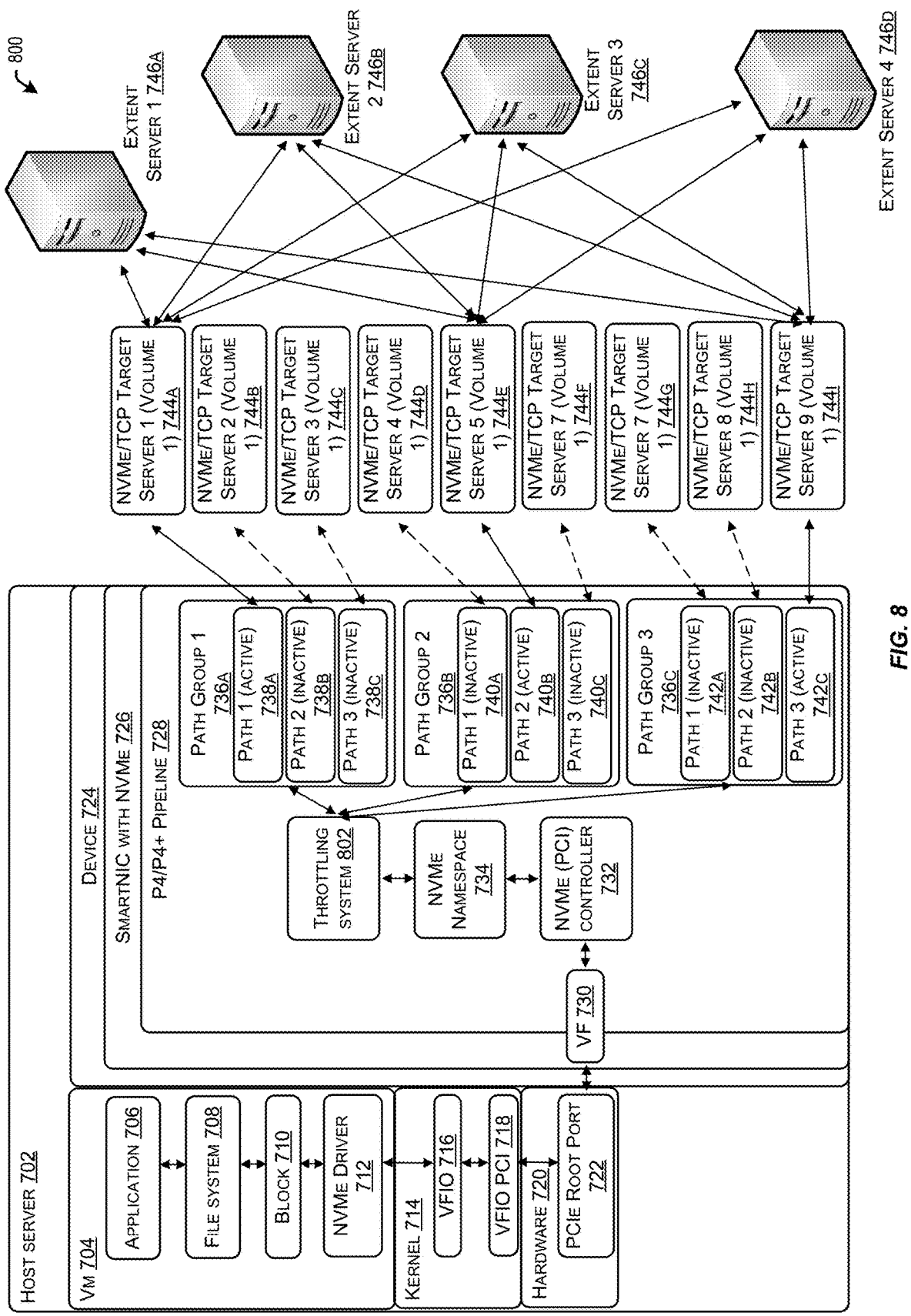
FIG. 8 is a block diagram illustrating a system including a throttling system and multiple path groups for processing I/O processing operations, according to at least one embodiment.

In some instances, the cloud infrastructure environment as described herein can include a host server 702 implementing both I/O throttling and multiple pathing as described herein. FIG. 8 is a block diagram 800 illustrating a system including a throttling system 802 and multiple path groups for processing I/O processing operations.

As shown in FIG. 8, the device (e.g., computing instance) 724 can include a throttling system 802. The throttling system can include features similar to throttling system 402 as described in FIG. 3, for example. For instance, the throttling system 802 can throttle data transmission to each extent server 746*a*-*d* to 1 million IOPS. The throttling system 802 can assign portions of I/O processing operations to be executed by the extent servers 746*a*-*d* as described herein.

Further, in FIG. 8, the host server 702 can include multiple path groups 736*a*-*c* capable of providing a failover in the event a first path is unavailable. For instance, the I/O processing operations as assigned to extent servers 746*a*-*d* by throttling system 802 can be routed to the extent servers 746*a*-*d* via path groups 736*a*-*c*. Accordingly, the present embodiments can mitigate performance degradation and ensure performance in processing I/O processing operations by implementing a throttling system at a host server and/or providing multiple paths (or path groups) for routing the I/O processing operations to the extent servers.

Figure 9:
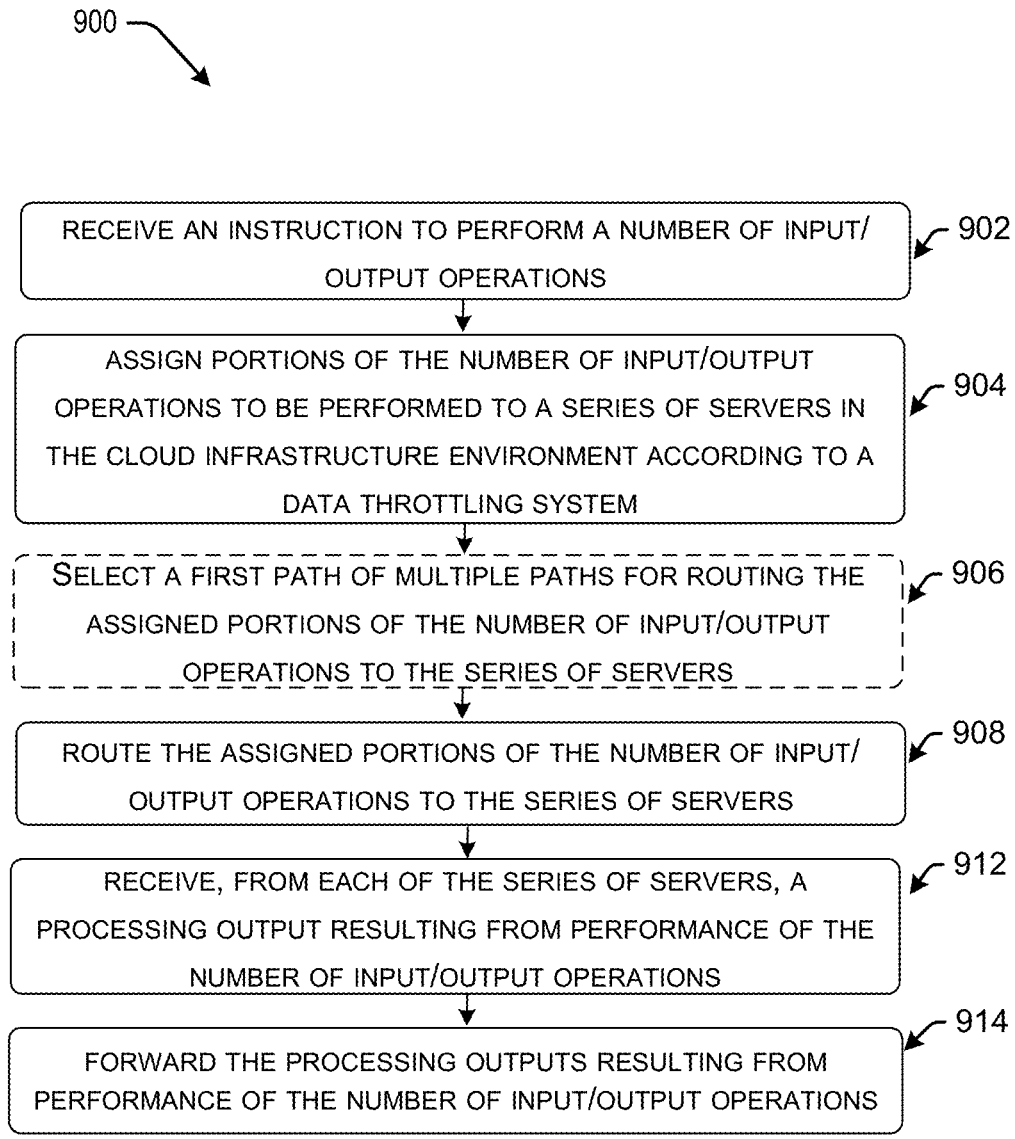
FIG. 9 is a flow process of a method for distributing input/output operations to be performed by a series of servers in a cloud infrastructure environment, according to at least one embodiment.

FIG. 9 is a flow process of a method 900 for distributing input/output operations to be performed by a series of servers in a cloud infrastructure environment. The method can be performed by a computing instance (e.g., device 200) within a host server (e.g., 100) or a series of interconnected computing devices in a cloud infrastructure environment.

At 902, the method can include receiving an instruction to perform a number of input/output operations from an application interacting with a client. For example, an application executing on a host server (e.g., application 306 in host server 302 in FIG. 3) can receive a request to perform a number of input/output operations by a series of extent servers in the cloud infrastructure environment. In some instances, the instruction to perform the number of input/output operations can be forwarded to the computing instance via a NVMe driver executed by the host server.

At 904, the method can include assigning portions of the number of input/output operations to be performed to a series of servers in the cloud infrastructure environment according to a data throttling system at the computing instance. A throttling system (e.g., 208 in FIG. 2) can be included in the computing instance and can dynamically assign portions of the number of input/output operations to the series of servers based on any of a variety of parameters. For example, the data throttling system can assign the portions of the number of input/output operations to the series of servers based on the throttling value that is derived based on a maximum throttling value for the series of servers and a number of servers in the series of servers. For example, if a maximum throttling value is 100 k IOPS and there are four extent servers, the throttling value for each server can include 25 k IOPS. In this example, the throttling system can assign I/O processing operations to the servers according to the throttling value and/or other parameters relating to each extent server.

The data throttling system can assign portions of the number of input/output operations to each of the series of servers based on a throttling value for the series of servers and one or more processing parameters for each of the series of servers. The one or more processing parameters include any of a previously-assigned number of input/output operations to each of the series of servers during a time duration and a delay in processing input/output operations In some instances, assigning portions of the number of input/output operations to be performed to a series of servers in the cloud infrastructure environment can include sequentially assigning each portion of the number of input/output operations according with the throttling value to each of the series of servers.

In some embodiments, at 906, the method can include selecting a first path of multiple paths for routing the assigned portions of the number of input/output operations to the series of servers. For instance, multiple paths can be provided to route assigned portions of the number of input/output operations to the series of servers, and a first path can be selected/utilized in routing the operations to the servers. In the event of a failure of the first path, the operations can be redirected to a second path of the multiple paths.

As another example, multiple path groups can be provided, with each path group including an active path and one or more inactive paths. I/O operations can be load-balanced across the path groups. In the event of a failure of an active path in the first path group, the operations can be redirected to an inactive path in the first path group. If all paths in a first path group fail, the operations can be redirected to an active path in a second path group.

At 908, the method can include routing the assigned portions of the number of input/output operations to the series of servers. For instance, the operations can be routed to the series of servers via a pipeline maintained by the computing instance. In some embodiments, the computing instance comprises a programmable network interface controller with NVMe executing within the host server. The computing instance can execute a P4 packet pipeline from the NVMe driver to the series of servers.

At 912, the method can include receiving, from each of the series of servers, a processing output resulting from performance of the number of input/output operations. For instance, as the servers execute assigned input/output operations, the computing instance can receive output data generated from the performance of the input/output operations.

At 914, the method can include forwarding the processing outputs resulting from performance of the number of input/output operations to the application. The client, via the application, can view processing outputs from the performance of the number of input/output operations by the series of servers.

E. IaaS Overview

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may first need (or, alternatively, be desired/expected) to be set up. In some instances, the provisioning can be done manually, a provisioning tool may be utilized to provision the resources, and/or deployment tools may be utilized to deploy the code once the infrastructure is provisioned.

Figure 10:
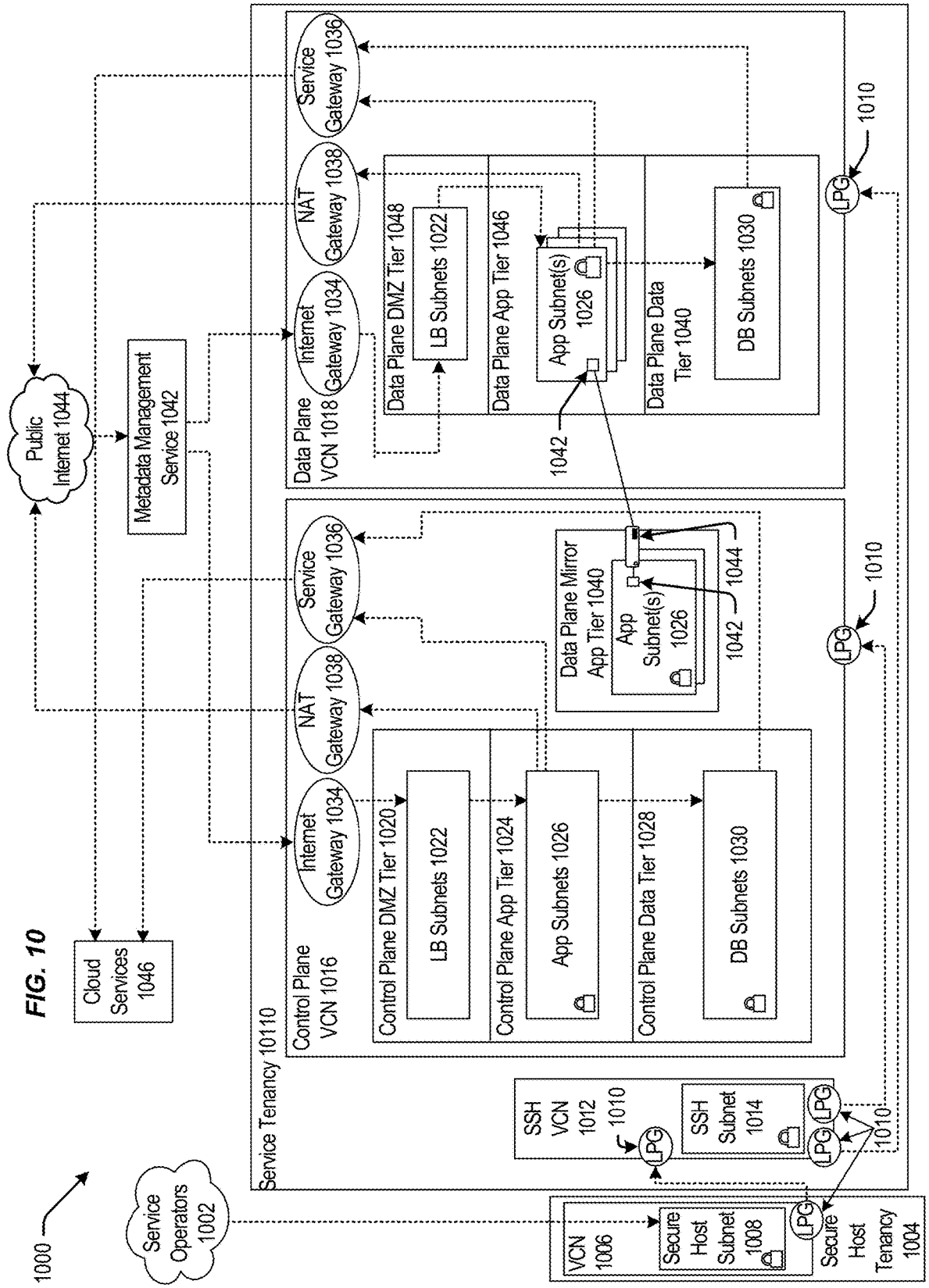
FIG. 10 is a block diagram illustrating one pattern for implementing a cloud infrastructure as a service system, according to at least one embodiment.

FIG. 10 is a block diagram 1000 illustrating an example pattern of an IaaS architecture, according to at least one embodiment. Service operators 1002 can be communicatively coupled to a secure host tenancy 1004 that can include a virtual cloud network (VCN) 1006 and a secure host subnet 1008. In some examples, the service operators 1002 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 12, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1006 and/or the Internet.

The VCN 1006 can include a local peering gateway (LPG) 1010 that can be communicatively coupled to a secure shell (SSH) VCN 1012 via an LPG 1010 contained in the SSH VCN 1012. The SSH VCN 1012 can include an SSH subnet 1014, and the SSH VCN 1012 can be communicatively coupled to a control plane VCN 1016 via the LPG 1010 contained in the control plane VCN 1016. Also, the SSH VCN 1012 can be communicatively coupled to a data plane VCN 1018 via an LPG 1010. The control plane VCN 1016 and the data plane VCN 1018 can be contained in a service tenancy 1019 that can be owned and/or operated by the IaaS provider.

The control plane VCN 1016 can include a control plane demilitarized zone (DMZ) tier 1020 that acts as a perimeter network (e.g., portions of a corporate network between the corporate intranet and external networks). The DMZ-based servers may have restricted responsibilities and help keep breaches contained. Additionally, the DMZ tier 1020 can include one or more load balancer (LB) subnet(s) 1022, a control plane app tier 1024 that can include app subnet(s) 1026, a control plane data tier 1028 that can include database (DB) subnet(s) 1030 (e.g., frontend DB subnet(s) and/or backend DB subnet(s)). The LB subnet(s) 1022 contained in the control plane DMZ tier 1020 can be communicatively coupled to the app subnet(s) 1026 contained in the control plane app tier 1024 and an Internet gateway 1034 that can be contained in the control plane VCN 1016, and the app subnet(s) 1026 can be communicatively coupled to the DB subnet(s) 1030 contained in the control plane data tier 1028 and a service gateway 1036 and a network address translation (NAT) gateway 1038. The control plane VCN 1016 can include the service gateway 1036 and the NAT gateway 1038.

The control plane VCN 1016 can include a data plane mirror app tier 1040 that can include app subnet(s) 1026. The app subnet(s) 1026 contained in the data plane mirror app tier 1040 can include a virtual network interface controller (VNIC) 1042 that can execute a compute instance 1044. The compute instance 1044 can communicatively couple the app subnet(s) 1026 of the data plane mirror app tier 1040 to app subnet(s) 1026 that can be contained in a data plane app tier 1046.

The data plane VCN 1018 can include the data plane app tier 1046, a data plane DMZ tier 1048, and a data plane data tier 1050. The data plane DMZ tier 1048 can include LB subnet(s) 1022 that can be communicatively coupled to the app subnet(s) 1026 of the data plane app tier 1046 and the Internet gateway 1034 of the data plane VCN 1018. The app subnet(s) 1026 can be communicatively coupled to the service gateway 1036 of the data plane VCN 1018 and the NAT gateway 1038 of the data plane VCN 1018. The data plane data tier 1050 can also include the DB subnet(s) 1030 that can be communicatively coupled to the app subnet(s) 1026 of the data plane app tier 1046.

The Internet gateway 1034 of the control plane VCN 1016 and of the data plane VCN 1018 can be communicatively coupled to a metadata management service 1052 that can be communicatively coupled to public Internet 1054. Public Internet 1054 can be communicatively coupled to the NAT gateway 1038 of the control plane VCN 1016 and of the data plane VCN 1018. The service gateway 1036 of the control plane VCN 1016 and of the data plane VCN 1018 can be communicatively couple to cloud services 1056.

In some examples, the service gateway 1036 of the control plane VCN 1016 or of the data plane VCN 1018 can make application programming interface (API) calls to cloud services 1056 without going through public Internet 1054. The API calls to cloud services 1056 from the service gateway 1036 can be one-way: the service gateway 1036 can make API calls to cloud services 1056, and cloud services 1056 can send requested data to the service gateway 1036. But, cloud services 1056 may not initiate API calls to the service gateway 1036.

In some examples, the secure host tenancy 1004 can be directly connected to the service tenancy 1019, which may be otherwise isolated. The secure host subnet 1008 can communicate with the SSH subnet 1014 through an LPG 1010 that may enable two-way communication over an otherwise isolated system. Connecting the secure host subnet 1008 to the SSH subnet 1014 may give the secure host subnet 1008 access to other entities within the service tenancy 1019.

The control plane VCN 1016 may allow users of the service tenancy 1019 to set up or otherwise provision desired resources. Desired resources provisioned in the control plane VCN 1016 may be deployed or otherwise used in the data plane VCN 1018. In some examples, the control plane VCN 1016 can be isolated from the data plane VCN 1018, and the data plane mirror app tier 1040 of the control plane VCN 1016 can communicate with the data plane app tier 1046 of the data plane VCN 1018 via VNICs 1042 that can be contained in the data plane mirror app tier 1040 and the data plane app tier 1046.

In some examples, users of the system, or customers, can make requests, for example create, read, update, or delete (CRUD) operations, through public Internet 1054 that can communicate the requests to the metadata management service 1052. The metadata management service 1052 can communicate the request to the control plane VCN 1016 through the Internet gateway 1034. The request can be received by the LB subnet(s) 1022 contained in the control plane DMZ tier 1020. The LB subnet(s) 1022 may determine that the request is valid, and in response to this determination, the LB subnet(s) 1022 can transmit the request to app subnet(s) 1026 contained in the control plane app tier 1024. If the request is validated and requires a call to public Internet 1054, the call to public Internet 1054 may be transmitted to the NAT gateway 1038 that can make the call to public Internet 1054. Memory that may be desired to be stored by the request can be stored in the DB subnet(s) 1030.

In some examples, the data plane mirror app tier 1040 can facilitate direct communication between the control plane VCN 1016 and the data plane VCN 1018. For example, changes, updates, or other suitable modifications to configuration may be desired to be applied to the resources contained in the data plane VCN 1018. Via a VNIC 1042, the control plane VCN 1016 can directly communicate with, and can thereby execute the changes, updates, or other suitable modifications to configuration to, resources contained in the data plane VCN 1018.

In some embodiments, the control plane VCN 1016 and the data plane VCN 1018 can be contained in the service tenancy 1019. In this case, the user, or the customer, of the system may not own or operate either the control plane VCN 1016 or the data plane VCN 1018. Instead, the IaaS provider may own or operate the control plane VCN 1016 and the data plane VCN 1018, both of which may be contained in the service tenancy 1019. This embodiment can enable isolation of networks that may prevent users or customers from interacting with other users', or other customers', resources. Also, this embodiment may allow users or customers of the system to store databases privately without needing to rely on public Internet 1054, which may not have a desired level of threat prevention, for storage.

In other embodiments, the LB subnet(s) 1022 contained in the control plane VCN 1016 can be configured to receive a signal from the service gateway 1036. In this embodiment, the control plane VCN 1016 and the data plane VCN 1018 may be configured to be called by a customer of the IaaS provider without calling public Internet 1054. Customers of the IaaS provider may desire this embodiment since database(s) that the customers use may be controlled by the IaaS provider and may be stored on the service tenancy 1019, which may be isolated from public Internet 1054.

Figure 11:
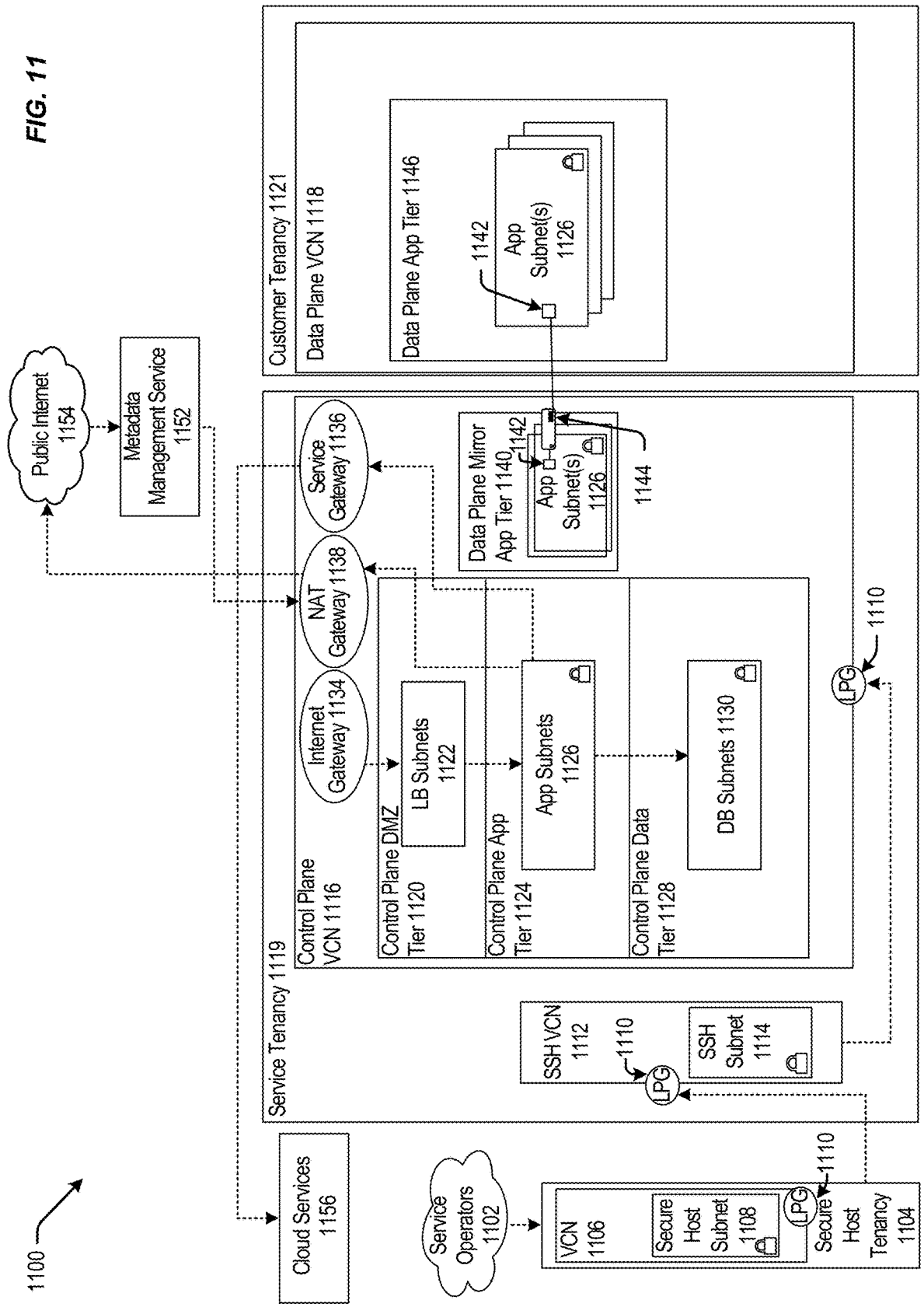
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 1002 of FIG. 10) can be communicatively coupled to a secure host tenancy 1104 (e.g. the secure host tenancy 1004 of FIG. 10) that can include a virtual cloud network (VCN) 1106 (e.g. the VCN 1006 of FIG. 10) and a secure host subnet 1108 (e.g. the secure host subnet 1008 of FIG. 10). The VCN 1106 can include a local peering gateway (LPG) 1110 (e.g. the LPG 1010 of FIG. 10) that can be communicatively coupled to a secure shell (SSH) VCN 1112 (e.g. the SSH VCN 1012 of FIG. 10) via an LPG 1010 contained in the SSH VCN 1112. The SSH VCN 1112 can include an SSH subnet 1114 (e.g. the SSH subnet 1014 of FIG. 10), and the SSH VCN 1112 can be communicatively coupled to a control plane VCN 1116 (e.g. the control plane VCN 1016 of FIG. 10) via an LPG 1110 contained in the control plane VCN 1116. The control plane VCN 1116 can be contained in a service tenancy 1119 (e.g. the service tenancy 1019 of FIG. 10), and the data plane VCN 1118 (e.g. the data plane VCN 1018 of FIG. 10) can be contained in a customer tenancy 1121 that may be owned or operated by users, or customers, of the system.

The control plane VCN 1116 can include a control plane DMZ tier 1120 (e.g. the control plane DMZ tier 1020 of FIG. 10) that can include LB subnet(s) 1122 (e.g. LB subnet(s) 1022 of FIG. 10), a control plane app tier 1124 (e.g. the control plane app tier 1024 of FIG. 10) that can include app subnet(s) 1126 (e.g. app subnet(s) 1026 of FIG. 10), a control plane data tier 1128 (e.g. the control plane data tier 1028 of FIG. 10) that can include database (DB) subnet(s) 1130 (e.g. similar to DB subnet(s) 1030 of FIG. 10). The LB subnet(s) 1122 contained in the control plane DMZ tier 1120 can be communicatively coupled to the app subnet(s) 1126 contained in the control plane app tier 1124 and an Internet gateway 1134 (e.g. the Internet gateway 1034 of FIG. 10) that can be contained in the control plane VCN 1116, and the app subnet(s) 1126 can be communicatively coupled to the DB subnet(s) 1130 contained in the control plane data tier 1128 and a service gateway 1136 (e.g. the service gateway of FIG. 10) and a network address translation (NAT) gateway 1138 (e.g. the NAT gateway 1038 of FIG. 10). The control plane VCN 1116 can include the service gateway 1136 and the NAT gateway 1138.

The control plane VCN 1116 can include a data plane mirror app tier 1140 (e.g. the data plane mirror app tier 1040 of FIG. 10) that can include app subnet(s) 1126. The app subnet(s) 1126 contained in the data plane mirror app tier 1140 can include a virtual network interface controller (VNIC) 1142 (e.g. the VNIC of 1042) that can execute a compute instance 1144 (e.g. similar to the compute instance 1044 of FIG. 10). The compute instance 1144 can facilitate communication between the app subnet(s) 1126 of the data plane mirror app tier 1140 and the app subnet(s) 1126 that can be contained in a data plane app tier 1146 (e.g. the data plane app tier 1046 of FIG. 10) via the VNIC 1142 contained in the data plane mirror app tier 1140 and the VNIC 1142 contained in the data plane app tier 1146.

The Internet gateway 1134 contained in the control plane VCN 1116 can be communicatively coupled to a metadata management service 1152 (e.g. the metadata management service 1052 of FIG. 10) that can be communicatively coupled to public Internet 1154 (e.g. public Internet 1054 of FIG. 10). Public Internet 1154 can be communicatively coupled to the NAT gateway 1138 contained in the control plane VCN 1116. The service gateway 1136 contained in the control plane VCN 1116 can be communicatively couple to cloud services 1156 (e.g. cloud services 1056 of FIG. 10).

In some examples, the data plane VCN 1118 can be contained in the customer tenancy 1121. In this case, the IaaS provider may provide the control plane VCN 1116 for each customer, and the IaaS provider may, for each customer, set up a unique compute instance 1144 that is contained in the service tenancy 1119. Each compute instance 1144 may allow communication between the control plane VCN 1116, contained in the service tenancy 1119, and the data plane VCN 1118 that is contained in the customer tenancy 1121. The compute instance 1144 may allow resources, that are provisioned in the control plane VCN 1116 that is contained in the service tenancy 1119, to be deployed or otherwise used in the data plane VCN 1118 that is contained in the customer tenancy 1121.

In other examples, the customer of the IaaS provider may have databases that live in the customer tenancy 1121. In this example, the control plane VCN 1116 can include the data plane mirror app tier 1140 that can include app subnet(s) 1126. The data plane mirror app tier 1140 can reside in the data plane VCN 1118, but the data plane mirror app tier 1140 may not live in the data plane VCN 1118. That is, the data plane mirror app tier 1140 may have access to the customer tenancy 1121, but the data plane mirror app tier 1140 may not exist in the data plane VCN 1118 or be owned or operated by the customer of the IaaS provider. The data plane mirror app tier 1140 may be configured to make calls to the data plane VCN 1118 but may not be configured to make calls to any entity contained in the control plane VCN 1116. The customer may desire to deploy or otherwise use resources in the data plane VCN 1118 that are provisioned in the control plane VCN 1116, and the data plane mirror app tier 1140 can facilitate the desired deployment, or other usage of resources, of the customer.

In some embodiments, the customer of the IaaS provider can apply filters to the data plane VCN 1118. In this embodiment, the customer can determine what the data plane VCN 1118 can access, and the customer may restrict access to public Internet 1154 from the data plane VCN 1118. The IaaS provider may not be able to apply filters or otherwise control access of the data plane VCN 1118 to any outside networks or databases. Applying filters and controls by the customer onto the data plane VCN 1118, contained in the customer tenancy 1121, can help isolate the data plane VCN 1118 from other customers and from public Internet 1154.

In some embodiments, cloud services 1156 can be called by the service gateway 1136 to access services that may not exist on public Internet 1154, on the control plane VCN 1116, or on the data plane VCN 1118. The connection between cloud services 1156 and the control plane VCN 1116 or the data plane VCN 1118 may not be live or continuous. Cloud services 1156 may exist on a different network owned or operated by the IaaS provider. Cloud services 1156 may be configured to receive calls from the service gateway 1136 and may be configured to not receive calls from public Internet 1154. Some cloud services 1156 may be isolated from other cloud services 1156, and the control plane VCN 1116 may be isolated from cloud services 1156 that may not be in the same region as the control plane VCN 1116. For example, the control plane VCN 1116 may be located in "Region 1," and cloud service "Deployment 10," may be located in Region 1 and in "Region 2." If a call to Deployment 10 is made by the service gateway 1136 contained in the control plane VCN 1116 located in Region 1, the call may be transmitted to Deployment 10 in Region 1. In this example, the control plane VCN 1116, or Deployment 10 in Region 1, may not be communicatively coupled to, or otherwise in communication with, Deployment 10 in Region 2.

Figure 12:
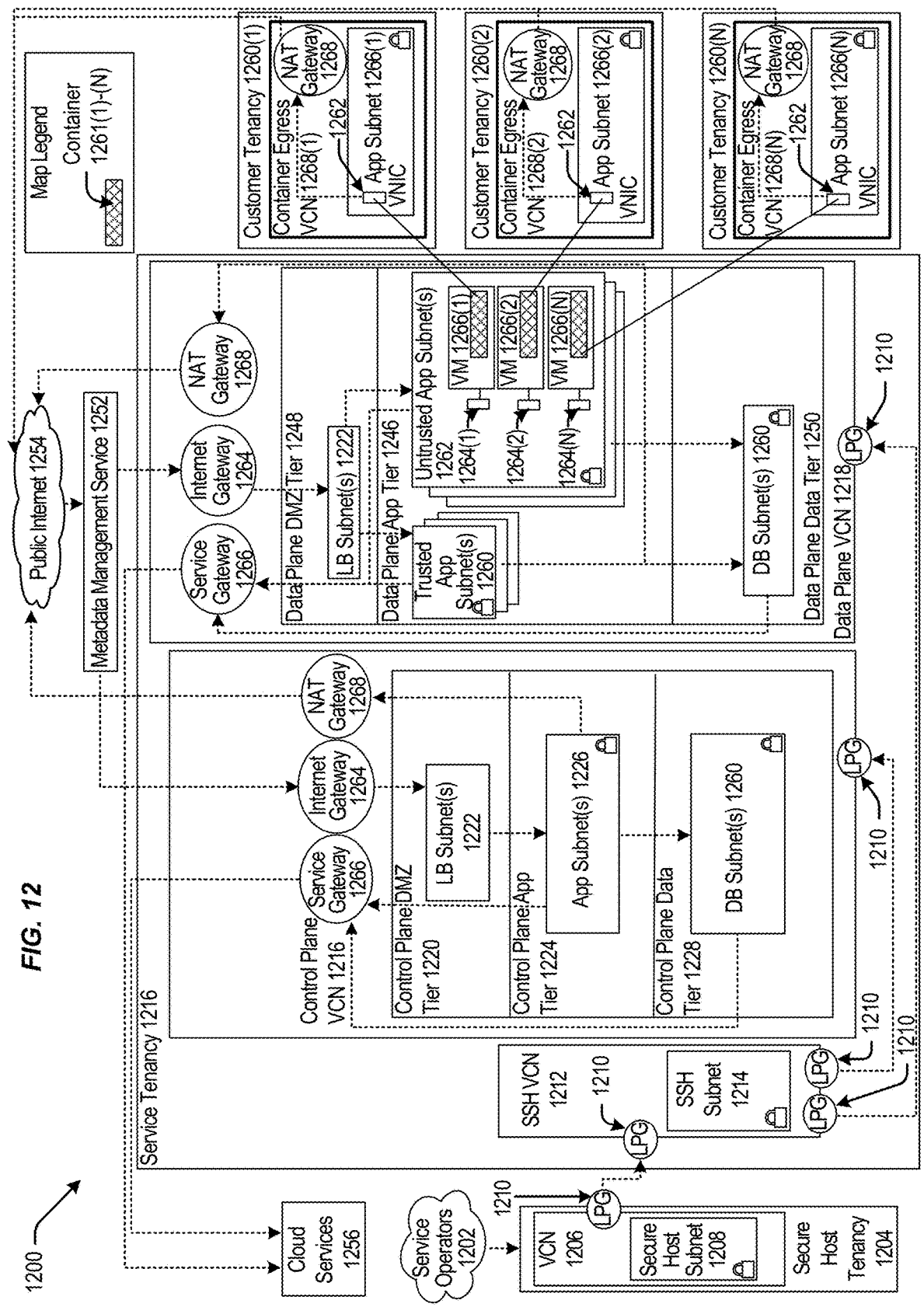
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g. service operators 1002 of FIG. 10) can be communicatively coupled to a secure host tenancy 1204 (e.g. the secure host tenancy 1004 of FIG. 10) that can include a virtual cloud network (VCN) 1206 (e.g. the VCN 1006 of FIG. 10) and a secure host subnet 1208 (e.g. the secure host subnet 1008 of FIG. 10). The VCN 1206 can include an LPG 1210 (e.g. the LPG 1010 of FIG. 10) that can be communicatively coupled to an SSH VCN 1212 (e.g. the SSH VCN 1012 of FIG. 10) via an LPG 1210 contained in the SSH VCN 1212. The SSH VCN 1212 can include an SSH subnet 1214 (e.g. the SSH subnet 1014 of FIG. 10), and the SSH VCN 1212 can be communicatively coupled to a control plane VCN 1216 (e.g. the control plane VCN 1016 of FIG. 10) via an LPG 1210 contained in the control plane VCN 1216 and to a data plane VCN 1218 (e.g. the data plane 1018 of FIG. 10) via an LPG 1210 contained in the data plane VCN 1218. The control plane VCN 1216 and the data plane VCN 1218 can be contained in a service tenancy 1219 (e.g. the service tenancy 1019 of FIG. 10).

The control plane VCN 1216 can include a control plane DMZ tier 1220 (e.g. the control plane DMZ tier 1020 of FIG. 10) that can include load balancer (LB) subnet(s) 1222 (e.g. LB subnet(s) 1022 of FIG. 10), a control plane app tier 1224 (e.g. the control plane app tier 1024 of FIG. 10) that can include app subnet(s) 1226 (e.g. similar to app subnet(s) 1026 of FIG. 10), a control plane data tier 1228 (e.g. the control plane data tier 1028 of FIG. 10) that can include DB subnet(s) 1230. The LB subnet(s) 1222 contained in the control plane DMZ tier 1220 can be communicatively coupled to the app subnet(s) 1226 contained in the control plane app tier 1224 and to an Internet gateway 1234 (e.g. the Internet gateway 1034 of FIG. 10) that can be contained in the control plane VCN 1216, and the app subnet(s) 1226 can be communicatively coupled to the DB subnet(s) 1230 contained in the control plane data tier 1228 and to a service gateway 1236 (e.g. the service gateway of FIG. 10) and a network address translation (NAT) gateway 1238 (e.g. the NAT gateway 1038 of FIG. 10). The control plane VCN 1216 can include the service gateway 1236 and the NAT gateway 1238.

The data plane VCN 1218 can include a data plane app tier 1246 (e.g. the data plane app tier 1046 of FIG. 10), a data plane DMZ tier 1248 (e.g. the data plane DMZ tier 1048 of FIG. 10), and a data plane data tier 1250 (e.g. the data plane data tier 1050 of FIG. 10). The data plane DMZ tier 1248 can include LB subnet(s) 1222 that can be communicatively coupled to trusted app subnet(s) 1260 and untrusted app subnet(s) 1262 of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include one or more primary VNICs 1264(1)-(N) that can be communicatively coupled to tenant virtual machines (VMs) 1266(1)-(N). Each tenant VM 1266(1)-(N) can be communicatively coupled to a respective app subnet 1267(1)-(N) that can be contained in respective container egress VCNs 1268(1)-(N) that can be contained in respective customer tenancies 1270(1)-(N). Respective secondary VNICs 1272(1)-(N) can facilitate communication between the untrusted app subnet(s) 1262 contained in the data plane VCN 1218 and the app subnet contained in the container egress VCNs 1268(1)-(N). Each container egress VCNs 1268(1)-(N) can include a NAT gateway 1238 that can be communicatively coupled to public Internet 1254 (e.g. public Internet 1054 of FIG. 10).

The Internet gateway 1234 contained in the control plane VCN 1216 and contained in the data plane VCN 1218 can be communicatively coupled to a metadata management service 1252 (e.g. the metadata management system 1052 of FIG. 10) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some embodiments, the data plane VCN 1218 can be integrated with customer tenancies 1270. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1246. Code to run the function may be executed in the VMs 1266(1)-(N), and the code may not be configured to run anywhere else on the data plane VCN 1218. Each VM 1266(1)-(N) may be connected to one customer tenancy 1270. Respective containers 1271(1)-(N) contained in the VMs 1266(1)-(N) may be configured to run the code. In this case, there can be a dual isolation (e.g., the containers 1271(1)-(N) running code, where the containers 1271(1)-(N) may be contained in at least the VM 1266(1)-(N) that are contained in the untrusted app subnet(s) 1262), which may help prevent incorrect or otherwise undesirable code from damaging the network of the IaaS provider or from damaging a network of a different customer. The containers 1271 (1)-(N) may be communicatively coupled to the customer tenancy 1270 and may be configured to transmit or receive data from the customer tenancy 1270. The containers 1271 (1)-(N) may not be configured to transmit or receive data from any other entity in the data plane VCN 1218. Upon completion of running the code, the IaaS provider may kill or otherwise dispose of the containers 1271(1)-(N).

In some embodiments, the trusted app subnet(s) 1260 may run code that may be owned or operated by the IaaS provider. In this embodiment, the trusted app subnet(s) 1260 may be communicatively coupled to the DB subnet(s) 1230 and be configured to execute CRUD operations in the DB subnet(s) 1230. The untrusted app subnet(s) 1262 may be communicatively coupled to the DB subnet(s) 1230, but in this embodiment, the untrusted app subnet(s) may be configured to execute read operations in the DB subnet(s) 1230. The containers 1271(1)-(N) that can be contained in the VM 1266(1)-(N) of each customer and that may run code from the customer may not be communicatively coupled with the DB subnet(s) 1230.

In other embodiments, the control plane VCN 1216 and the data plane VCN 1218 may not be directly communicatively coupled. In this embodiment, there may be no direct communication between the control plane VCN 1216 and the data plane VCN 1218. However, communication can occur indirectly through at least one method. An LPG 1210 may be established by the IaaS provider that can facilitate communication between the control plane VCN 1216 and the data plane VCN 1218. In another example, the control plane VCN 1216 or the data plane VCN 1218 can make a call to cloud services 1256 via the service gateway 1236. For example, a call to cloud services 1256 from the control plane VCN 1216 can include a request for a service that can communicate with the data plane VCN 1218.

Figure 13:
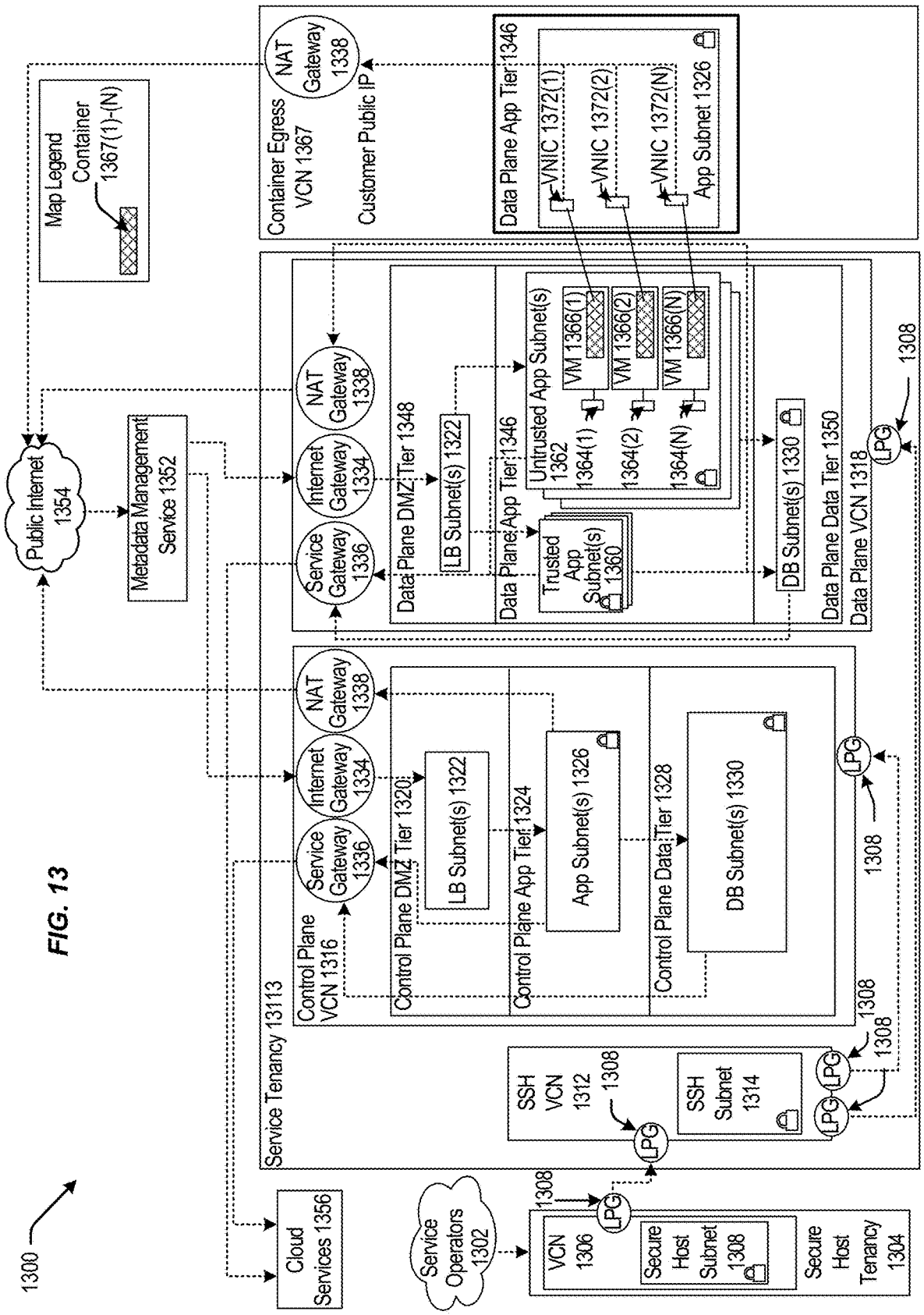
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g. service operators 1002 of FIG. 10) can be communicatively coupled to a secure host tenancy 1304 (e.g. the secure host tenancy 1004 of FIG. 10) that can include a virtual cloud network (VCN) 1306 (e.g. the VCN 1006 of FIG. 10) and a secure host subnet 1308 (e.g. the secure host subnet 1008 of FIG. 10). The VCN 1306 can include an LPG 1310 (e.g. the LPG 1010 of FIG. 10) that can be communicatively coupled to an SSH VCN 1312 (e.g. the SSH VCN 1012 of FIG. 10) via an LPG 1310 contained in the SSH VCN 1312. The SSH VCN 1312 can include an SSH subnet 1314 (e.g. the SSH subnet 1014 of FIG. 10), and the SSH VCN 1312 can be communicatively coupled to a control plane VCN 1316 (e.g. the control plane VCN 1016 of FIG. 10) via an LPG 1310 contained in the control plane VCN 1316 and to a data plane VCN 1318 (e.g. the data plane 1018 of FIG. 10) via an LPG 1310 contained in the data plane VCN 1318. The control plane VCN 1316 and the data plane VCN 1318 can be contained in a service tenancy 1319 (e.g. the service tenancy 1019 of FIG. 10).

The control plane VCN 1316 can include a control plane DMZ tier 1320 (e.g. the control plane DMZ tier 1020 of FIG. 10) that can include LB subnet(s) 1322 (e.g. LB subnet(s) 1022 of FIG. 10), a control plane app tier 1324 (e.g. the control plane app tier 1024 of FIG. 10) that can include app subnet(s) 1326 (e.g. app subnet(s) 1026 of FIG. 10), a control plane data tier 1328 (e.g. the control plane data tier 1028 of FIG. 10) that can include DB subnet(s) 1330 (e.g. DB subnet(s) 1230 of FIG. 12). The LB subnet(s) 1322 contained in the control plane DMZ tier 1320 can be communicatively coupled to the app subnet(s) 1326 contained in the control plane app tier 1324 and to an Internet gateway 1334 (e.g. the Internet gateway 1034 of FIG. 10) that can be contained in the control plane VCN 1316, and the app subnet(s) 1326 can be communicatively coupled to the DB subnet(s) 1330 contained in the control plane data tier 1328 and to a service gateway 1336 (e.g. the service gateway of FIG. 10) and a network address translation (NAT) gateway 1338 (e.g. the NAT gateway 1038 of FIG. 10). The control plane VCN 1316 can include the service gateway 1336 and the NAT gateway 1338.

The data plane VCN 1318 can include a data plane app tier 1346 (e.g. the data plane app tier 1046 of FIG. 10), a data plane DMZ tier 1348 (e.g. the data plane DMZ tier 1048 of FIG. 10), and a data plane data tier 1350 (e.g. the data plane data tier 1050 of FIG. 10). The data plane DMZ tier 1348 can include LB subnet(s) 1322 that can be communicatively coupled to trusted app subnet(s) 1360 (e.g. trusted app subnet(s) 1260 of FIG. 12) and untrusted app subnet(s) 1362 (e.g. untrusted app subnet(s) 1262 of FIG. 12) of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include primary VNICs 1364(1)-(N) that can be communicatively coupled to tenant virtual machines (VMs) 1366(1)-(N) residing within the untrusted app subnet(s) 1362. Each tenant VM 1366(1)-(N) can run code in a respective container 1367(1)-(N), and be communicatively coupled to an app subnet 1326 that can be contained in a data plane app tier 1346 that can be contained in a container egress VCN 1368. Respective secondary VNICs 1372(1)-(N) can facilitate communication between the untrusted app subnet(s) 1362 contained in the data plane VCN 1318 and the app subnet contained in the container egress VCN 1368. The container egress VCN can include a NAT gateway 1338 that can be communicatively coupled to public Internet 1354 (e.g. public Internet 1054 of FIG. 10).

The Internet gateway 1334 contained in the control plane VCN 1316 and contained in the data plane VCN 1318 can be communicatively coupled to a metadata management service 1352 (e.g. the metadata management system 1052 of FIG. 10) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some examples, the pattern illustrated by the architecture of block diagram 1300 of FIG. 13 may be considered an exception to the pattern illustrated by the architecture of block diagram 1200 of FIG. 12 and may be desirable for a customer of the IaaS provider if the IaaS provider cannot directly communicate with the customer (e.g., a disconnected region). The respective containers 1367(1)-(N) that are contained in the VMs 1366(1)-(N) for each customer can be accessed in real-time by the customer. The containers 1367(1)-(N) may be configured to make calls to respective secondary VNICs 1372(1)-(N) contained in app subnet(s) 1326 of the data plane app tier 1346 that can be contained in the container egress VCN 1368. The secondary VNICs 1372(1)-(N) can transmit the calls to the NAT gateway 1338 that may transmit the calls to public Internet 1354. In this example, the containers 1367(1)-(N) that can be accessed in real-time by the customer can be isolated from the control plane VCN 1316 and can be isolated from other entities contained in the data plane VCN 1318. The containers 1367(1)-(N) may also be isolated from resources from other customers.

In other examples, the customer can use the containers 1367(1)-(N) to call cloud services 1356. In this example, the customer may run code in the containers 1367(1)-(N) that requests a service from cloud services 1356. The containers 1367(1)-(N) can transmit this request to the secondary VNICs 1372(1)-(N) that can transmit the request to the NAT gateway that can transmit the request to public Internet 1354. Public Internet 1354 can transmit the request to LB subnet(s) 1322 contained in the control plane VCN 1316 via the Internet gateway 1334. In response to determining the request is valid, the LB subnet(s) can transmit the request to app subnet(s) 1326 that can transmit the request to cloud services 1356 via the service gateway 1336.

It should be appreciated that IaaS architectures 1000, 1100, 1200, 1300 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 14:
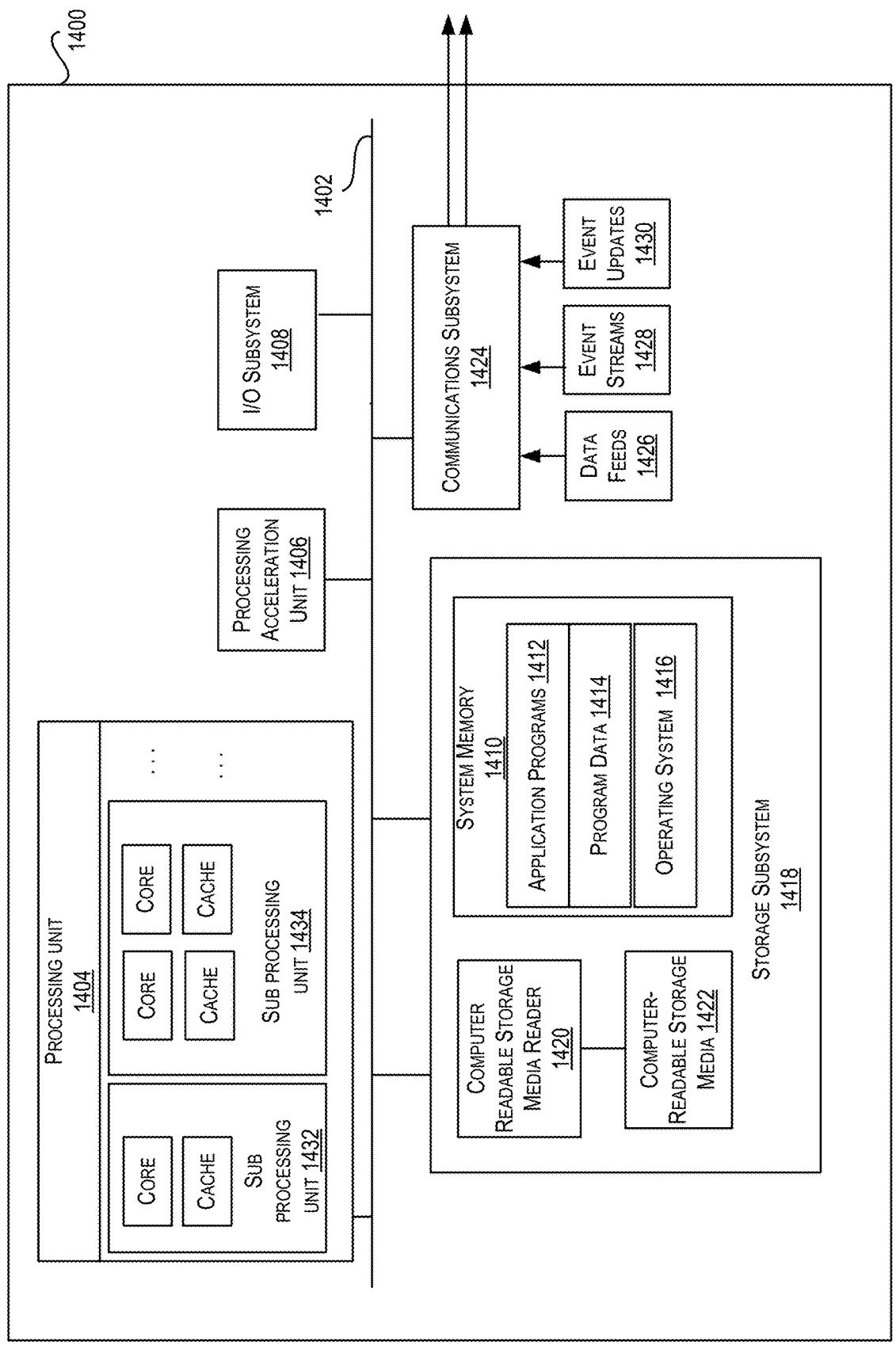
FIG. 14 is a block diagram illustrating an example computer system, according to at least one embodiment.

FIG. 14 illustrates an example computer system 1400, in which various embodiments may be implemented. The system 1400 may be used to implement any of the computer systems described above. As shown in the figure, computer system 1400 includes a processing unit 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 includes tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1404, which can be implemented as one or more integrated circuits (e.g., a conventional microprocessor or microcontroller), controls the operation of computer system 1400. One or more processors may be included in processing unit 1404. These processors may include single core or multicore processors. In certain embodiments, processing unit 1404 may be implemented as one or more independent processing units 1432 and/or 1434 with single or multicore processors included in each processing unit. In other embodiments, processing unit 1404 may also be implemented as a quad-core processing unit formed by integrating two dual-core processors into a single chip.

In various embodiments, processing unit 1404 can execute a variety of programs in response to program code and can maintain multiple concurrently executing programs or processes. At any given time, some or all of the program code to be executed can be resident in processor(s) 1404 and/or in storage subsystem 1418. Through suitable programming, processor(s) 1404 can provide various functionalities described above. Computer system 1400 may additionally include a processing acceleration unit 1406, which can include a digital signal processor (DSP), a special-purpose processor, and/or the like.

I/O subsystem 1408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1400 may comprise a storage subsystem 1418 that comprises software elements, shown as being currently located within a system memory 1410. System memory 1410 may store program instructions that are loadable and executable on processing unit 1404, as well as data generated during the execution of these programs.

Depending on the configuration and type of computer system 1400, system memory 1410 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1404. In some implementations, system memory 1410 may include multiple different types of memory, such as static random access memory (SRAM) or dynamic random access memory (DRAM). In some implementations, a basic input/output system (BIOS), containing the basic routines that help to transfer information between elements within computer system 1400, such as during start-up, may typically be stored in the ROM. By way of example, and not limitation, system memory 1410 also illustrates application programs 1412, which may include client applications, Web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 14 OS, and Palm® OS operating systems.

Storage subsystem 1418 may also provide a tangible computer-readable storage medium for storing the basic programming and data constructs that provide the functionality of some embodiments. Software (programs, code modules, instructions) that when executed by a processor provide the functionality described above may be stored in storage subsystem 1418. These software modules or instructions may be executed by processing unit 1404. Storage subsystem 1418 may also provide a repository for storing data used in accordance with the present disclosure.

Storage subsystem 1400 may also include a computer-readable storage media reader 1420 that can further be connected to computer-readable storage media 1422. Together and, optionally, in combination with system memory 1410, computer-readable storage media 1422 may comprehensively represent remote, local, fixed, and/or removable storage devices plus storage media for temporarily and/or more permanently containing, storing, transmitting, and retrieving computer-readable information.

Computer-readable storage media 1422 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1400.

By way of example, computer-readable storage media 1422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1422 may include, but is not limited to, Zip® drives, flash memory cards, universal serial bus (USB) flash drives, secure digital (SD)

cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1400.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to connect to one or more devices via the Internet. In some embodiments communications subsystem 1424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

In some embodiments, communications subsystem 1424 may also receive input communication in the form of structured and/or unstructured data feeds 1426, event streams 1428, event updates 1430, and the like on behalf of one or more users who may use computer system 1400.

By way of example, communications subsystem 1424 may be configured to receive data feeds 1426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1424 may also be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

The invention claimed is:

1. A cloud infrastructure node comprising:
a processor; and
a non-transitory computer-readable medium including instructions that, when executed by the processor, cause the processor to:
receive an instruction to perform a number of input/output operations from an application interacting with a client;
assign portions of the number of input/output operations to be performed to a series of servers in a cloud infrastructure environment according to a data throttling system at a computing instance, the data throttling system assigning the portions of the number of input/output operations to each of the series of servers based at least in part on a throttling value for the series of servers and one or more processing parameters for each of the series of servers, the instruction to perform the number of input/output operations being directed to the computing instance via a non-volatile memory express (NVMe) driver, the computing instance comprising a programmable network interface controller with NVMe executing within the computing instance, and the computing instance executing a packet pipeline from the NVMe driver to the series of servers;
select a first routing path of multiple routing paths to route the assigned portions of the number of input/output operations from the cloud infrastructure node to the series of servers;
route the assigned portions of the number of input/output operations to the series of servers via a target server using the first routing path;
receive, from each of the series of servers via the target server, respective processing outputs resulting from performance of the number of input/output operations; and
forward the respective processing outputs resulting from the performance of the number of input/output operations to the application.

2. The cloud infrastructure node of claim 1, wherein the instructions further cause the processor to:
determine that the first routing path of the multiple routing paths is unavailable; and
responsive to determining that the first routing path is unavailable, redirect the assigned portions of the number of input/output operations to a second path connecting the cloud infrastructure node to the series of servers.

3. The cloud infrastructure node of claim 1, wherein the instructions further cause the processor to:
determine that the first routing path of the multiple routing paths is unavailable, the first routing path being part of a first path group comprising the first routing path as an active path and a second routing path as an inactive path; and
responsive to determining that the first routing path is unavailable, redirect the assigned portions of the number of input/output operations to the second routing path connecting the cloud infrastructure node to the series of servers.

4. The cloud infrastructure node of claim 3, wherein the instructions further cause the processor to:
determine that the second routing path is unavailable; and
responsive to determining that the second routing path is unavailable, redirect the assigned portions of the number of input/output operations to an active path in a second path group connecting the cloud infrastructure node to the series of servers.

5. The cloud infrastructure node of claim 1, wherein each of the multiple routing paths provide a namespace with a NVMe/Transmission Control Protocol (TCP) connection to the series of servers.

6. A method for distributing input/output operations to be performed by a series of servers in a cloud infrastructure environment, the method comprising:
receiving, at a computing instance in the cloud infrastructure environment, an instruction to perform a number of input/output operations from an application interacting with a client;
assigning portions of the number of input/output operations to be performed to a series of servers in the cloud infrastructure environment according to a data throttling system at the computing instance, the data throttling system assigning the portions of the number of input/output operations to each of the series of servers based at least in part on a throttling value for the series of servers and one or more processing parameters for each of the series of servers, the instruction to perform the number of input/output operations being directed to the computing instance via a non-volatile memory express (NVMe) driver, the computing instance comprises a programmable network interface controller with NVMe executing within the computing instance, and the computing instance executing a packet pipeline from the NVMe driver to the series of servers;

routing the assigned portions of the number of input/output operations to the series of servers via a target server;

receiving, from each of the series of servers via the target server, a processing output resulting from performance of the number of input/output operations; and forwarding the processing output resulting from the performance of the number of input/output operations to the application.

7. The method of claim 6, wherein the data throttling system assigns the portions of the number of input/output operations to the series of servers based on the throttling value that is derived based on a maximum throttling value for the series of servers and a number of servers in the series of servers.

8. The method of claim 6, wherein the one or more processing parameters include any of a previously-assigned number of the input/output operations to each of the series of servers during a time duration and a delay in processing input/output operations.

9. The method of claim 6, wherein assigning the portions of the number of input/output operations to be performed to a series of servers in the cloud infrastructure environment includes sequentially assigning each portion of the number of input/output operations according with the throttling value to each of the series of servers.

10. The method of claim 6, wherein the assigned portions of the number of input/output operations are routed to the series of servers on a first routing path of multiple routing paths from the computing instance to the series of servers, and wherein each of the multiple routing paths provide an alternative routing path for the assigned portions of the number of input/output operations to the series of servers in an event of a failure of the first routing path.

11. The method of claim 6, wherein the assigned portions of the number of input/output operations are routed to the series of servers on a first routing path group of multiple routing path groups, the first routing path group providing a first active path and multiple inactive paths, wherein each of the inactive paths providing alternative routing paths for the assigned portions of the number of input/output operations to the series of servers in an event of a failure of the first active path in the first routing path group.

12. The method of claim 11, wherein each of the multiple routing paths provide a namespace with a non-volatile memory express (NVMe) transmission control protocol (TCP) connection to the series of servers.

13. A non-transitory computer-readable medium including stored thereon a sequence of instructions which, when executed by a processor causes the processor to execute a process, the process comprising:

receiving an instruction to perform a number of input/output operations from an application interacting with a client;

assigning portions of the number of input/output operations to be performed to a series of servers in a cloud infrastructure environment according to a data throttling system at a computing instance, wherein the computing instance comprises a programmable network interface controller with non-volatile memory express (NVMe) executing within the computing instance, the computing instance executing a packet pipeline providing input/output operations to the series of servers;

selecting a first routing path of multiple routing paths to route the assigned portions of the number of input/output operations to the series of servers routing the assigned portions of the number of input/output operations to the series of servers via the first routing path;

receiving, from each of the series of servers, a processing output resulting from performance of the number of input/output operations; and forwarding the processing output resulting from the performance of the number of input/output operations to an application capable of being interacted with by a client.

14. The non-transitory computer-readable medium of claim 13, wherein the instruction to perform the number of input/output operations is directed to the computing instance via a NVMe driver.

15. The non-transitory computer-readable medium of claim 14, wherein the data throttling system assigns portions of the number of input/output operations to each of the series of servers based on a throttling value for the series of servers and one or more processing parameters for each of the series of servers.

16. The non-transitory computer-readable medium of claim 15, wherein the data throttling system assigns the portions of the number of input/output operations to the series of servers based on the throttling value that is derived based on a maximum throttling value for the series of servers and a number of servers in the series of servers.

17. The non-transitory computer-readable medium of claim 15, wherein the one or more processing parameters include any of a previously-assigned number of input/output operations to each of the series of servers during a time duration and a delay in processing input/output operations.

18. The non-transitory computer-readable medium of claim 14, wherein the process further includes:
determining that the first routing path of the multiple routing paths is unavailable; and
responsive to determining that the first routing path is unavailable, redirecting the assigned portions of the number of input/output operations to a second path connected to the series of servers.

19. The non-transitory computer-readable medium of claim 14, wherein the process further includes:
determining that the first routing path of the multiple routing paths is unavailable, the first routing path part of a first path group comprising the first routing path as an active path and a second routing path as an inactive path; and
responsive to determining that the first routing path is unavailable, redirecting the assigned portions of the number of input/output operations to the second routing path connected to the series of servers.

20. The non-transitory computer-readable medium of claim 19, wherein the process further includes:
determining that the second routing path is unavailable; and
responsive to determining that the second routing path is unavailable, redirecting the assigned portions of the number of input/output operations to an active path in a second path group connected to the series of servers.

\* \* \* \* \*

UNITED STATES PATENT AND TRADEMARK OFFICE
CERTIFICATE OF CORRECTION

PATENT NO. : 11,650,745 B1
APPLICATION NO. : 17/515357
DATED : May 16, 2023
INVENTOR(S) : Lee et al.

Page 1 of 1

It is certified that error appears in the above-identified patent and that said Letters Patent is hereby corrected as shown below:

In the Specification

In Column 7, Line 67, delete "server3" and insert -- server 3 --, therefor.

In Column 11, Line 12, delete "operations" and insert -- operations. --, therefor.

In Column 25, Line 24, delete "evolution)," and insert -- evolution)), --, therefor.

In the Claims

In Column 30, Line 9, in Claim 13, delete "server" and insert -- servers; --, therefor.

Signed and Sealed this
Twentieth Day of February, 2024

Katherine Kelly Vidal

Katherine Kelly Vidal
*Director of the United States Patent and Trademark Office*